US012609237B2

(12) United States Patent
Hoshino et al.

(10) Patent No.: US 12,609,237 B2
(45) Date of Patent: Apr. 21, 2026

(54) COIL COMPONENT AND METHOD OF MANUFACTURING THE SAME

(71) Applicant: TAIYO YUDEN CO., LTD., Tokyo (JP)

(72) Inventors: Hideaki Hoshino, Tokyo (JP); Kenichiro Nogi, Tokyo (JP); Ichiro Yokoyama, Tokyo (JP); Yoshiaki Kamiyama, Tokyo (JP); Yukihiro Saida, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 1175 days.

(21) Appl. No.: 17/540,901

(22) Filed: Dec. 2, 2021

(65) Prior Publication Data

US 2022/0189681 A1 Jun. 16, 2022

(30) Foreign Application Priority Data

Dec. 11, 2020 (JP) ................................ 2020-206264

(51) Int. Cl.

| | |
|---|---|
| ***H01F 27/29*** | (2006.01) |
| ***H01F 17/00*** | (2006.01) |
| ***H01F 17/04*** | (2006.01) |
| ***H01F 41/04*** | (2006.01) |

(52) U.S. Cl.

CPC ....... *H01F 27/292* (2013.01); *H01F 17/0013* (2013.01); *H01F 17/04* (2013.01); *H01F 41/041* (2013.01); *H01F 2017/0066* (2013.01); *H01F 2017/048* (2013.01)

(58) Field of Classification Search

CPC .... H01F 27/292; H01F 17/0013; H01F 17/04; H01F 41/041

See application file for complete search history.

(56) References Cited

U.S. PATENT DOCUMENTS

| | | | | |
|---|---|---|---|---|
| 2005/0068150 A1* | 3/2005 | Matsutani | H01F 17/04 336/223 |
| 2014/0132383 A1* | 5/2014 | Matsuura | C22C 38/18 336/83 |
| 2016/0172102 A1* | 6/2016 | Jeong | H01F 27/255 29/605 |

(Continued)

FOREIGN PATENT DOCUMENTS

| | | | |
|---|---|---|---|
| JP | 2020-126914 A | 8/2020 | |
| KR | 20210133163 * | 11/2021 | H01F 41/125 |

*Primary Examiner* — Shawki S Ismail

(74) *Attorney, Agent, or Firm* — CUSHMAN PARTNERS, LLC

(57) ABSTRACT

A coil component according to one or more embodiments of the invention includes a base body containing a plurality of metal magnetic particles, a coil conductor, and an external electrode. In one or more embodiments, the coil conductor has a coil portion disposed inside the base body, and an end surface exposed from a first surface of the base body. The coil conductor is configured such that the ratio of the dimension of a section of the coil portion in a short axis direction to the dimension of the end surface in a short axis direction is 0.5 to 0.95, the section of the coil portion is orthogonal to the direction in which current flows through the coil portion. In one or more embodiments, the external electrode is provided on the first surface such that it is connected to the end surface of the lead-out portion.

13 Claims, 18 Drawing Sheets

(56) References Cited

U.S. PATENT DOCUMENTS

| | | | | |
|---|---|---|---|---|
| 2016/0172103 | A1* | 6/2016 | Jeong | H01F 27/255<br>29/605 |
| 2019/0066901 | A1* | 2/2019 | Jeong | H01F 17/04 |
| 2019/0189338 | A1* | 6/2019 | Kim | H01F 27/29 |
| 2020/0251273 | A1* | 8/2020 | Takai | H01F 27/292 |
| 2021/0050140 | A1* | 2/2021 | Ryu | H01F 27/324 |
| 2021/0202157 | A1* | 7/2021 | Shin | H01F 27/292 |
| 2021/0350964 | A1* | 11/2021 | Hwang | H01F 27/292 |
| 2022/0189681 | A1* | 6/2022 | Hoshino | H01F 17/0013 |

* cited by examiner

COIL COMPONENT AND METHOD OF MANUFACTURING THE SAME

CROSS-REFERENCE TO RELATED APPLICATIONS

This application is based on and claims the benefit of priority from Japanese Patent Application Serial No. 2020-206264 (filed on Dec. 11, 2020), the contents of which are hereby incorporated by reference in its entirety.

TECHNICAL FIELD

The present disclosure relates to a coil component and a manufacturing method thereof.

BACKGROUND

Conventional coil components typically include a base body made of a magnetic material, a coil conductor embedded in the magnetic base body, and a pair of external electrodes connected to ends of the coil conductor. The coil conductor includes a winding portion wound around a coil axis, and a pair of lead-out portions that extend from ends of the winding portion to a surface of the base body. The coil conductor is connected to external electrodes at end surfaces of the winding portion exposed from the base body. The external electrodes are formed by applying a conductive paste, which is a mixture of metal particles of Ag or the like and thermosetting resin, to a part of the surface of the base body, and then heat-treating the conductive paste. A surface of the external electrode may have a Sn or Ni plating layer provided thereon. One example of the conventional coil components is disclosed in, for example, Japanese Patent Application Publication No. 2020-126914 ("the '914 Publication").

In addition to a sintered ferrite described in the '914 Publication, metal magnetic materials containing metal magnetic particles are also used as the magnetic material for the base body. Since the metal magnetic materials have higher saturation magnetic flux densities than the ferrite material, they are suitable to make the base body of the coil component through which a large current flows.

The inventors found that when the conductive paste, which is the material for the external electrode, is applied to the surface of the base body made of a metal magnetic material, the applied conductive paste seeps into the base body, resulting in a thinner conductive paste in the area where the applied conductive paste faces an end surface of the lead-out portion. The inventors also found that when the conductive paste having such a thinned area is heat-treated, a concave portion is likely to be formed in the external electrode at a position opposite the lead-out portion, and this concave portion may cause a crack in the external electrode.

SUMMARY

One object of the present disclosure is to overcome or reduce at least a part of the above drawback. Specifically, the present disclosure aims to suppress the formation of concave portions in the outer surface of the external electrode, which may cause a crack The other objects of the disclosure will be apparent with reference to the entire description in this specification. The invention disclosed herein may solve any other drawbacks grasped from the following description, instead of or in addition to the above drawback.

A coil component according to one or more aspects of the invention includes a base body containing a plurality of metal magnetic particles, a coil conductor, and an external electrode. In one or more aspects of the invention, the coil conductor has a coil portion disposed inside the base body, and an end surface exposed from a first surface of the base body. In one or more aspects of the invention, the coil conductor is configured such that the ratio of the dimension of a section of the coil portion in a short axis direction to the dimension of the end surface in a short axis direction is 0.5 to 0.95, the section of the coil portion is orthogonal to the direction in which current flows through the coil portion. In one or more aspects, the external electrode is provided on the first surface such that it is connected to the end surface of the lead-out portion.

In one or more aspects of the invention, the coil conductor includes a winding portion wound around a coil axis and a lead-out portion that has the end surface exposed from the first surface of the base body and is connected to one end of the winding portion.

In one or more aspects of the invention, the external electrode has a concave portion in its outer surface at a position opposite the end surface of the lead-out portion. In one or more aspects of the invention, the ratio of the depth of the concave portion to the dimension in a short-axis direction of a section of the winding portion orthogonal to a direction in which current flows through the winding portion is 0.1 or less.

In one or more aspects of the invention, the dimension in the short-axis direction of the section of the winding portion orthogonal to the direction in which current flows through the winding portion is in the range of 30 to 110 μm.

In one or more aspects of the invention, the winding portion and the lead-out portion are formed of conductive paste having a same composition.

In one or more embodiments of the invention, the void ratio of the base body is 5% or more and less than 20%.

In one or more aspects of the invention, the void ratio of the lead-out portion is less than 1%.

In one or more aspects of the invention, the dimension of the end surface of the lead-out portion in a long-axis direction is larger than the dimension in a long-axis direction of the section of the winding portion orthogonal to a direction in which current flows through the winding portion.

In one or more aspects of the invention, the area of the end surface of the lead-out portion is equal to the area of a section of the winding portion orthogonal to a direction in which current flows through the winding portion.

In one or more aspects of the invention, the lead-out portion is formed of a single conductive layer, and the winding portion is formed of multiple conductive layers.

In one or more aspects of the invention, the area of the end surface of the lead-out portion is equal to the section of the base portion cut in a plane parallel to the first surface. In one or more aspects of the invention, the area of the end surface of the lead-out portion is larger than a section of the base portion cut in a plane parallel to the first surface.

In one or more aspects of the invention, the ratio of the dimension of the end surface of the lead-out portion in a short-axis direction to the dimension in a short-axis direction of the section of the winding portion cut in a plane parallel to the coil axis is 0.5 to 0.6.

According to another aspect of the invention, a circuit board includes any one of the above coil components. Yet another aspect of the invention relates to an electronic device including the above circuit board.

A method of manufacturing a coil component according to one or more aspects of the invention includes a step of fabricating an intermediate body. The intermediate body includes a base body and a coil conductor, the base body containing a plurality of metal magnetic particles, the coil conductor having a coil portion disposed in the base body and an end surface exposed from a first surface of the base body, a ratio of a dimension of the end surface in a short axis direction to a dimension of a section of the coil portion in a short axis direction being 0.5 to 0.95, the section of the coil portion being orthogonal to a direction in which current flows through the coil portion. A method of manufacturing a coil component according to the one or more aspects of the invention further includes a step of applying conductive paste on a surface of the intermediate body such that the end surface of the lead-out portion is covered with the conductive paste.

In one or more aspects of the invention, the lead-out portion has a base portion whose one end is connected to the winding portion and a tip portion that is connected to the other end of the base portion and formed of a single conductive layer. The base portion may include multiple conductive layers. The step of fabricating the intermediate body includes forming, on a magnetic sheet, a first conductive layer that has a shape corresponding to the winding portion when viewed in plan, and forming, on the magnetic sheet, a second conductive layer that has a shape corresponding to the base portion and the tip portion when viewed in plan such that the second conductive layer abuts the first conductive layer. In one or more aspects of the invention, the step of fabricating the intermediate body includes forming, on a magnetic sheet, a first conductive layer that has a shape corresponding to the winding portion and the base portion in plan view, and forming, on the magnetic sheet, a second conductive layer that has a shape corresponding to the tip portion in plan view such that the second conductive layer abuts the first conductive layer.

In one or more aspects of the invention, the step of fabricating the intermediate body includes forming, on a magnetic sheet, a first conductive layer that has a shape corresponding to the winding portion in plan view, and forming, on the first conductive layer, a second conductive layer that has a shape corresponding to the winding portion, the base portion, and the tip portion in plan view.

In one or more aspects of the invention, the step of fabricating the intermediate body includes forming, on a magnetic sheet, a first conductive layer that has a shape corresponding to the winding portion, the base portion, and the tip portion in plan view, and forming, on the first conductive layer, a second conductive layer that has a shape corresponding to the winding portion and the base portion in plan view.

In one or more aspects of the invention, the step of fabricating the intermediate body includes forming, on a magnetic sheet, a first conductive layer that has a shape corresponding to the winding portion, the base portion, and the tip portion in plan view, and forming, on the first conductive layer, a second conductive layer that has a shape corresponding to the winding portion in plan view.

ADVANTAGEOUS EFFECTS

According to one or more aspects of the invention, it is possible to suppress the formation of concave portions in the outer surface of the external electrode, which may cause a crack.

DESCRIPTION OF THE EMBODIMENTS

Various embodiments of the present invention will be hereinafter described with reference to the accompanying drawings. The constituents common to multiple drawings are denoted by the same reference signs throughout the drawings. It should be noted that the drawings are not necessarily drawn to an accurate scale for the sake of convenience of explanation.

Figure 1:
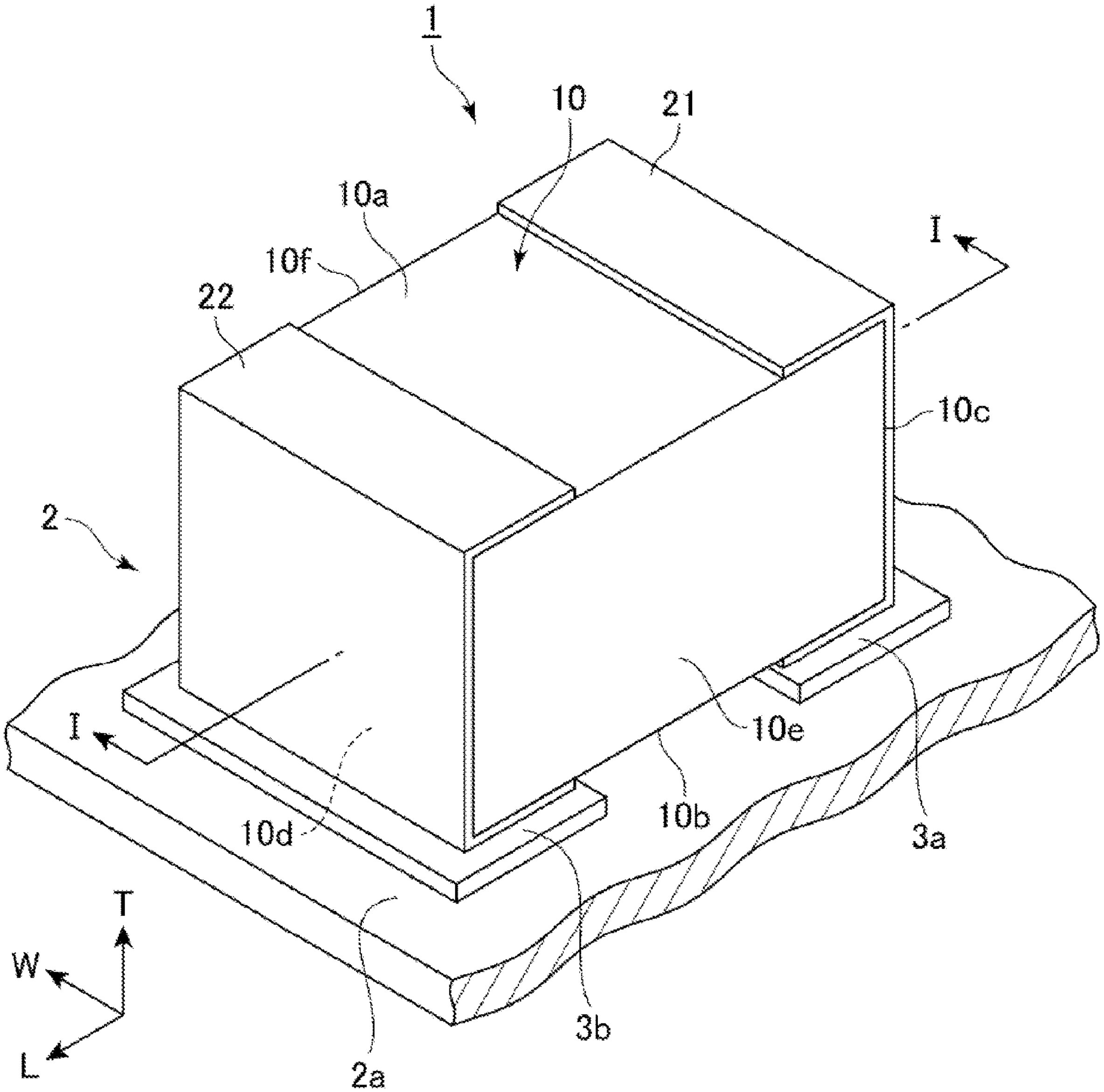
FIG. 1 is a perspective view of a coil component according to one embodiment of the disclosure.
Figure 2:
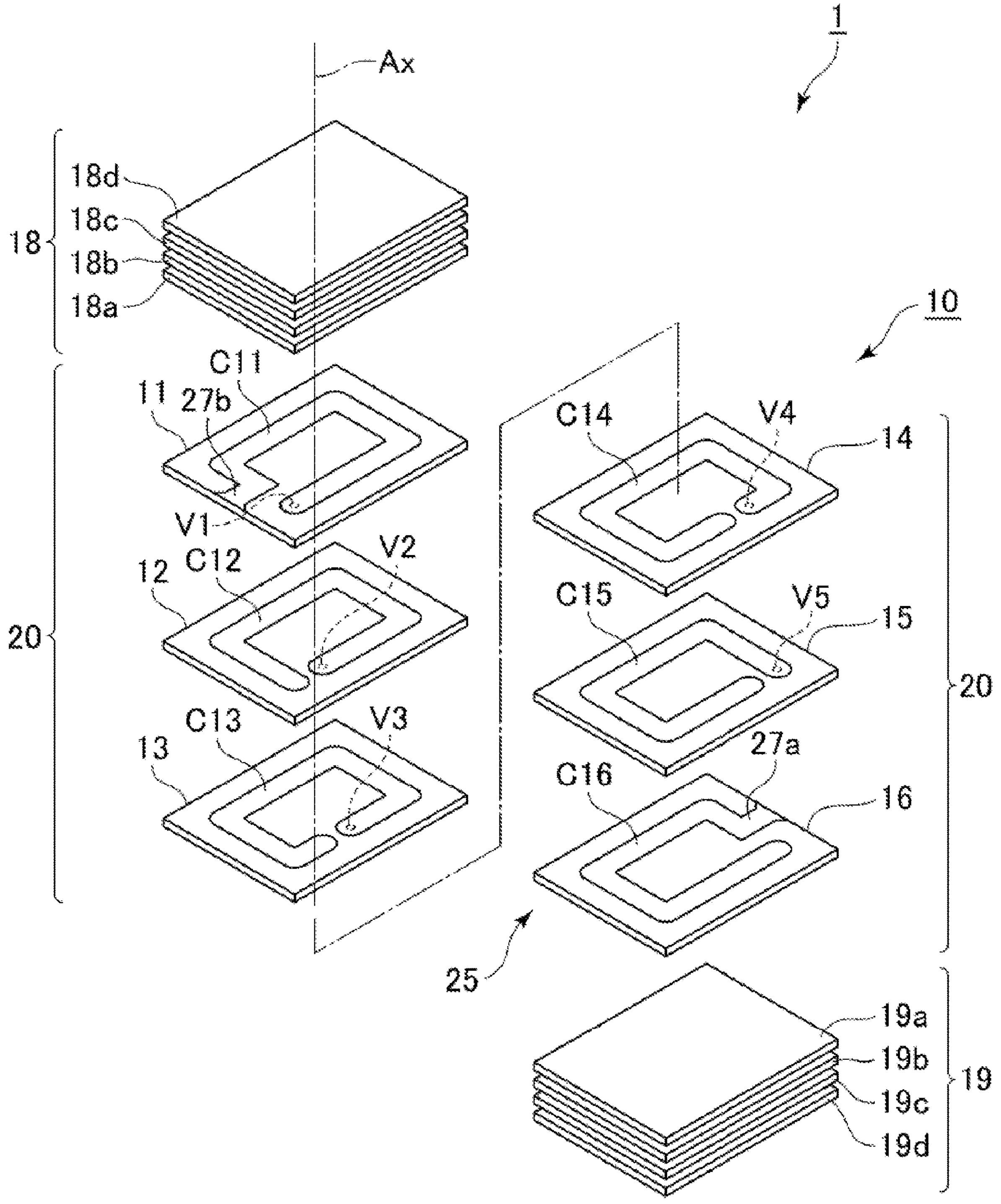
FIG. 2 is an exploded perspective view of the coil component shown in FIG. 1.
Figure 3:
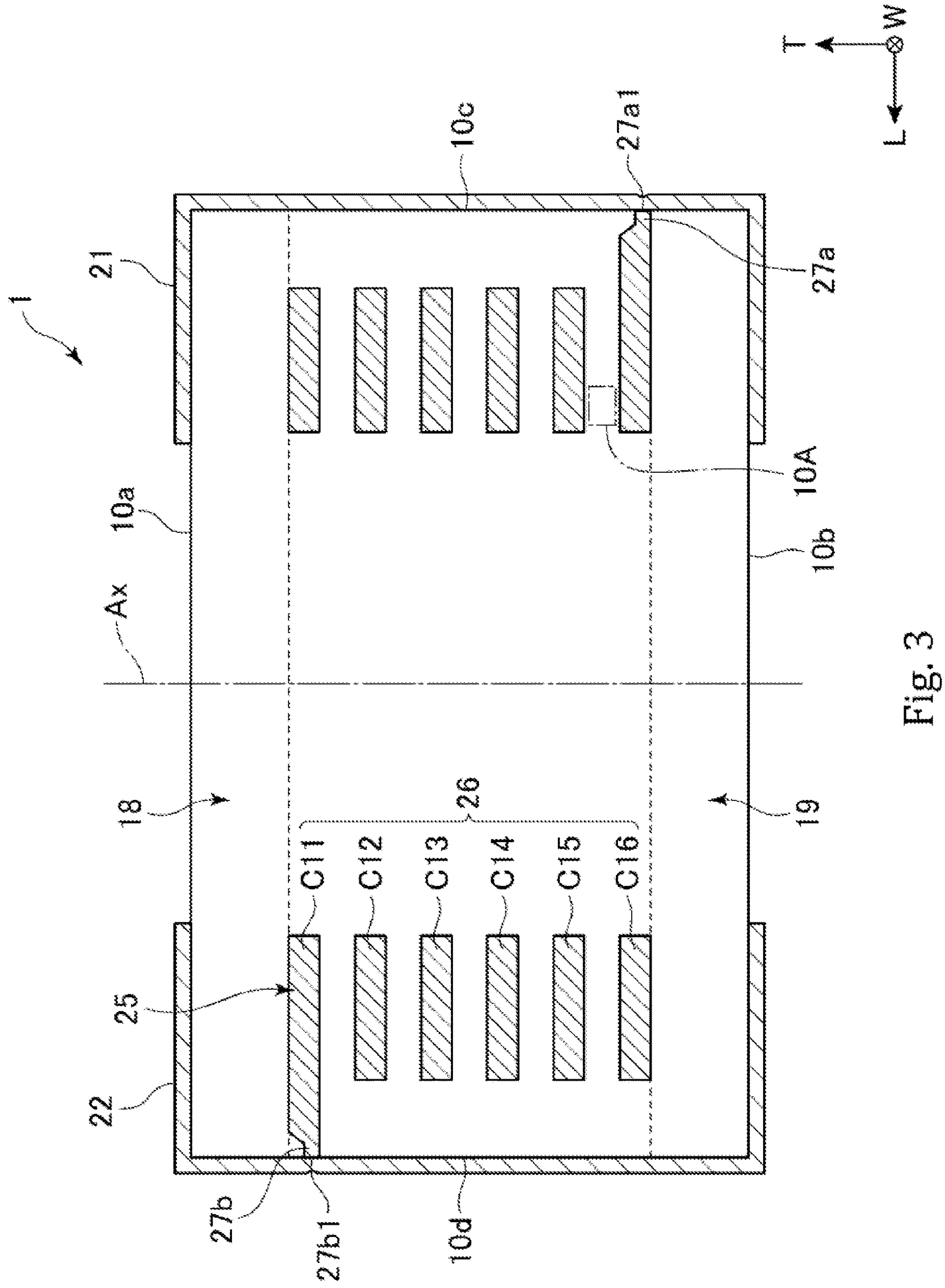
FIG. 3 schematically shows a cross-section of the coil component along the line I-I in FIG. 1.
Figure 4:
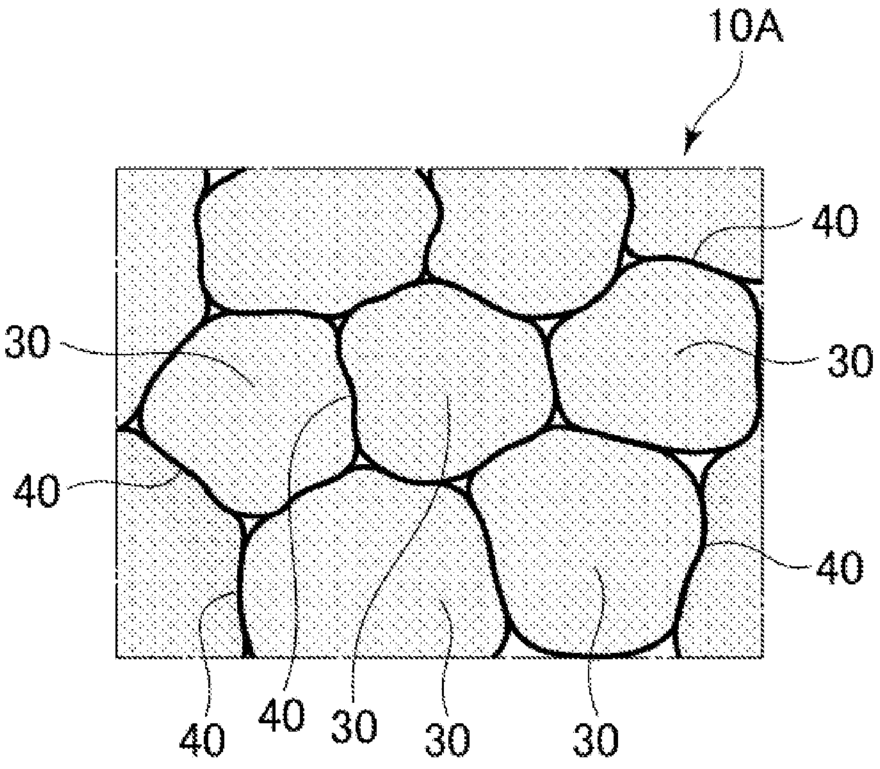
FIG. 4 schematically illustrates a region 10A of the section of the magnetic base body shown in FIG. 3.

A coil component 1 according to one embodiment of the disclosure will be hereinafter described with reference to FIGS. 1 to 4. FIG. 1 is a perspective view of the coil component 1 according to one embodiment of the invention, FIG. 2 is an exploded perspective view of the coil component 1, FIG. 3 schematically shows the cross-section of the coil component 1 along the I-I line in FIG. 1, and FIG. 4 schematically shows a region 10A of the section of the coil component 1 shown in FIG. 3. The coil component 1 is an example of coil components to which the present invention is applicable. In the illustrated embodiment, the coil component 1 is a multilayer inductor. The multilayer inductor may be used as a power inductor incorporated into a power supply line or as other various inductors. The invention is applicable to a variety of coil components in addition to the multilayer inductor illustrated, such as those fabricated by thin-film processes and those fabricated by compression molding processes.

As shown, the coil component 1 according to one or more embodiments of the invention includes a base body 10, a coil conductor 25, an external electrode 21 provided on a surface of the base body 10, and an external electrode 22 disposed on the surface of the base body 10 at a position spaced from the external electrode 21. The coil conductor 25 has a coil portion disposed inside the base body 10, and end surfaces 27*a*1, 27*b*1 exposed from the base body 10. As will be described later, the coil portion includes a winding portion 26 and lead-out portions 27*a*, 27*b*.

The coil component 1 is mounted on a mounting substrate 2*a*. The mounting substrate 2*a* has two land portions 3*a*, 3*b* provided thereon. The coil component 1 is mounted on the mounting substrate 2*a* by bonding the external electrode 21 to the land portion 3*a* and the external electrode 22 to the land portion 3*b*. As described, a circuit board 2 includes the coil component 1 and the mounting substrate 2*a* having the coil component 1 mounted thereon. The circuit board 2 may include the coil component 1 and various electronic components in addition to the coil component 1.

The circuit board 2 can be installed in various electronic devices. The electronic devices in which the circuit board 2 may be installed include smartphones, tablets, game consoles, servers, electrical components of automobiles, and various other electronic devices. The electronic devices in which the coil component 1 may be installed are not limited to those specified herein. The inductor 1 may be a built-in component embedded in the circuit board 2.

In the embodiment shown, the base body 10 has a rectangular parallelepiped shape as a whole. The base body 10 has a first principal surface 10*a*, a second principal surface 10*b*, a first end surface 10*c*, a second end surface 10*d*, a first side surface 10*e*, and a second side surface 10*f*, and the six surfaces define the outer surface of the base body 10. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. In FIG. 1, the first principal surface 10*a* lies on the top side of the base body 1, and therefore, the first principal surface 10*a* may be herein referred to as the "top surface." Similarly, the second principal surface 10*b* may be referred to as the "bottom surface." The coil component 1 is disposed such that the second principal surface 10*b* faces the circuit board 2, and therefore, the second principal surface 10*b* may be herein referred to as a "mounting surface." The top-bottom direction of the coil component 1 mentioned herein refers to the top-bottom direction in FIG. 1. In this specification, a "length" direction, a "width" direction, and a "thickness" direction of the coil component 1 are referred to as an "L axis" direction, a "W axis" direction, and a "T axis" direction in FIG. 1, respectively, unless otherwise construed from the context. The L axis, the W axis, and the T axis are orthogonal to one another. The coil axis Ax extends in the T axis direction. For example, the coil axis Ax passes through the intersection of the diagonal lines of the first principal surface 10*a*, which is rectangular shaped as seen from above, and extends perpendicularly to the first principal surface 10*a*.

In one or more embodiments of the invention, the coil component 1 has a length (the dimension in the direction of the L axis) of 0.2 to 6.0 mm, a width (the dimension in the direction of the W axis) of 0.1 to 4.5 mm, and a thickness (the dimension in the direction of the T axis) of 0.1 to 4.0 mm. These dimensions are mere examples, and the coil component 1 to which the present invention is applicable can have any dimensions that conform to the purport of the present invention. In one or more embodiments, the coil component 1 has a low profile. For example, the coil component 1 has a width larger than the height thereof.

The base body 10 is a structure made of a magnetic material. The base body 10 is a structure formed, for example, by bonding a plurality of metal magnetic particles on which an insulating film is formed on their surfaces. As shown in FIG. 4, each of the metal magnetic particles 30 contained in the base body 10 is bonded to an adjacent metal magnetic particle 30 via an insulating film 40. The insulating film 40 may be, for example, an oxide film formed by oxidizing the surface of each of the metal magnetic particles 30. The insulating film 40 on the surface of the metal magnetic particles may be a coating film made of an insulating material with an excellent insulation property. Some of the metal magnetic particles 30 may be directly bonded to each other without the insulating film 40. In one or more embodiments, resin may be used to bond the metal magnetic particles 30 to adjacent metal magnetic particles 30.

In the base body 10, voids exist between the metal magnetic particles 30. The voids in the base body 10 refer to areas of the base body 10 that are not occupied by the metal magnetic particles 30 or the insulating film 40. A void ratio of the base body 10 is greater than that of the coil conductor 25. In one or more embodiments of the invention, the void ratio of the base body 10 is equal to or greater than 5% and less than 20%. As used herein, the void ratio of the base body 10 is defined as a ratio of the area of voids in a predetermined region in a section of the base body 10. The area of the voids in the section of the base body 10 is calculated in the following manner, for example. The base body 10 is cut in the thickness direction (the T-axis direction) to expose a section, and an image of the section is captured using a scan electron microscope (SEM) with a predetermined magnification factor (for example, a magnification factor of 1000) to obtain an SEM image showing as an observation field a part of the section of the base body 10. The captured SEM image is then subjected to image processing such as binarization, so that voids and non-void regions are distinguished from each other and the area of the regions classified as the voids is calculated. The binarization may be replaced with multi-value processing. The thus calculated areas of the voids in the observation field are summed up, and the total area of the voids in the observation field is divided by the area of the observation field. In this manner, the void ratio is calculated. The void ratio, expressed as a percentage, is given by the following equation.

$$\text{Void ratio (\%)} = (\text{Total area of voids in observation field} / \text{Total area of observation field}) \times 100$$

In one embodiment, the metal magnetic particles 30 may include particles of, for example, (1) Fe—Si—Cr based alloy, Fe—Si—Al based alloy, or Fe—Ni alloy; (2) Fe—Si—Cr—B—C amorphous alloy, or Fe—Si—B—Cr amorphous alloy; or (3) a material of any combination thereof. When the metal magnetic particles are of an alloy-based material, the content of Fe in the metal magnetic particles may be 80 wt % or more but less than 92 wt %. When the metal magnetic particles are of an amorphous material, the content of Fe in the metal magnetic particles may be 72 wt % or more but less than 85 wt %. Since the metal magnetic particles contain particles of elements other than Fe (Si and metal elements that are more susceptible to oxidation than Fe), oxidation of Fe contained in the metal magnetic particles can be prevented. In the metal magnetic particles, metal elements that are more susceptible to oxidation than Si and Fe account for, in total, 8 wt % or more.

The metal magnetic particles 30 used to make the base body 10 may include two or more types of metal magnetic particles having different average particle sizes. For example, the metal magnetic particles 30 used to make the base body 10 may include first metal magnetic particles having a first average particle size and second metal magnetic particles having a second average particle size smaller than the first average particle size. When the second metal magnetic particles have a smaller average particle size than the first metal magnetic particles, the second metal magnetic particles can easily enter the gap between the adjacent ones of the first metal magnetic particles. Consequently, the base body 10 can achieve a higher filling rate (density) of the metal magnetic particles. By increasing the filling ratio of the metal magnetic particles in the base body 10, the void ratio of the base body 10 can be reduced. In one embodiment, the metal magnetic particles 30 used to make the base body 10 may further include third metal magnetic particles having a third average particle size smaller than the second average particle size.

As shown in FIG. 2, the base body 10 may include a plurality of magnetic layers stacking on top of each other. As shown, the base body 10 includes a body portion 20, a top cover layer 18 provided on the top surface of the body portion 20, and a bottom cover layer 19 provided on the bottom surface of the body portion 20. The body portion 20 includes magnetic layers 11 to 16 stacked together. The top cover layer 18 includes four magnetic layers 18*a* to 18*d*. The bottom cover layer 19 includes four magnetic layers 19*a* to 19*d*. The base body 10 includes the top cover layer 18, the magnetic layer 11, the magnetic layer 12, the magnetic layer 13, the magnetic layer 14, the magnetic layer 15, the magnetic layer 16, and the bottom cover layer 19 that are stacked in this order from the top to the bottom in FIG. 2. The coil component 1 can include any number of magnetic layers as necessary in addition to the magnetic layers 11 to 16, the magnetic layers 18*a* to 18*d*, and the magnetic layers 19*a* to 19*d*. Some of the magnetic layers 11 to 16, the magnetic layers 18*a* to 18*d*, and the magnetic layers 19*a* to 19*d* can be omitted as appropriate. Although the boundaries between the magnetic layers are shown in FIG. 3, the boundaries between the magnetic layers may not be visible in the base body 10 of the actual coil component to which the invention is applied.

The magnetic layers 11 to 16 have the conductor patterns C11 to C16 respectively and conductor patterns that corresponds to the lead-out portions 27*a*, 27*b* formed on the upper surfaces thereof. These conductor patterns are formed by printing conductive paste, which is a mixture of metal particles of such as Ag and a binder resin, on the surface of the magnetic layers 11 to 16. The conductor patterns C11 to C16 and the conductor patterns corresponding to the lead-out portions 27*a* and 27*b* may be formed of conductive pastes having the same composition. Since the metal particles contained in the conductive paste are sintered during heat treatment, the coil conductor 25 has a dense structure with a small number of voids. In one or more embodiments of the invention, the void ratio of the coil conductor 25 is, for example, smaller than 1%. The void ratio of the coil conductor 25 may be measured in the same way as the void ratio of the base body 10.

The magnetic layers 11 to 15 respectively have vias V1 to V5 formed therein at a predetermined position. The vias V1 to V5 are formed by forming a through-hole at the predetermined position in the magnetic layers 11 to 15 such that they extend through the magnetic layers 11 to 15 in the T-axis direction and filling the through-holes with the above mentioned conductive paste. The conductor patterns C11 to C16 extend around the coil axis Ax. In the embodiment shown, the coil axis Ax extends in the T axis direction, which is the same as the direction in which the magnetic layers 11 to 16 are stacked on each other.

Each of the conductor patterns C11 to C16 is electrically connected to the respective adjacent conductor patterns through the vias V1 to V6. The conductor patterns C11 to C16 connected in this manner form the spiral winding portion 26. In other words, the winding portion 26 of the coil conductor 25 includes the conductor patterns C11 to C16 and the vias V1 to V5.

The end of the conductor pattern C11 opposite the end connected to the via V1 is connected to the external electrode 22 via the lead-out conductor 27*b*. The end of the conductor pattern C16 opposite to the end connected to the via V5 is connected to the external electrode 21 via the lead-out conductor 27*a*. As described, the coil conductor 25 includes the winding portion 26, the lead-out portion 27*a*, and the lead-out portion 27*b*.

As described above, the coil conductor 25 has the winding portion 26 extending around the coil axis Ax and is arranged within the base body 10. Of the coil conductor 25, an end surface 27*a*1 of the lead-out portion 27*a* and an end surface 27*b*1 of the lead-out portion 27*b* are exposed outward from the base body 10, but the rest of the portions of the coil conductor 25 other than the end surface 27*a*1 and the lead-out portion 27*b* are disposed within the base body 10.

Figure 5A:
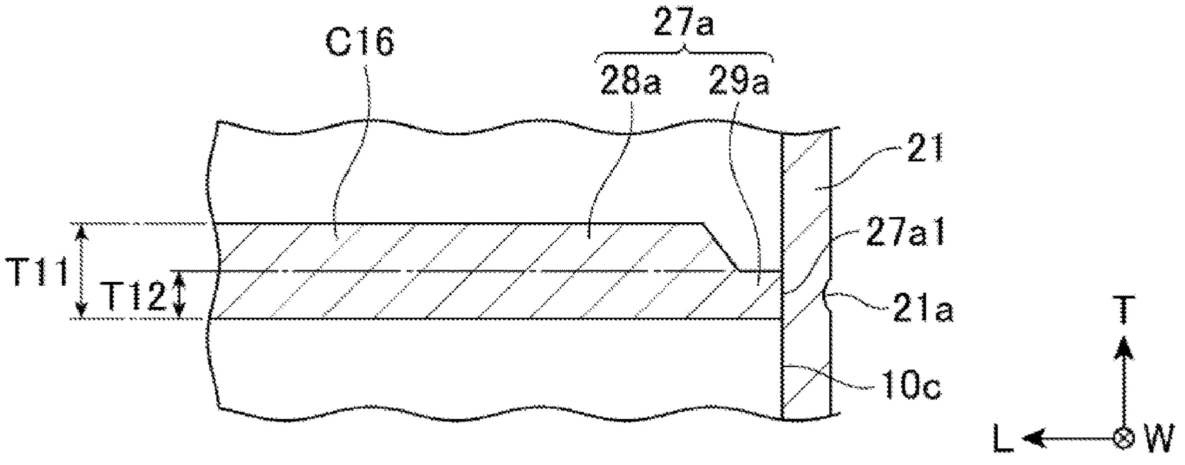
FIG. 5A is an enlarged sectional view of an area around a lead -out portion 27*a* in the section of the coil component of FIG. 3.
Figure 5B:
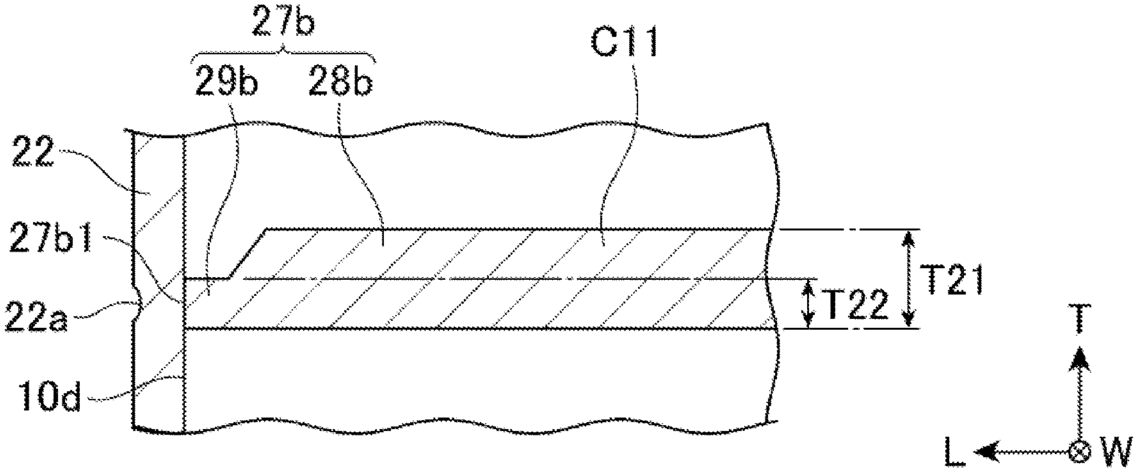
FIG. 5B is an enlarged sectional view of an area around a lead -out portion 27*b* in the section of the coil component of FIG. 3.
Figure 6A:
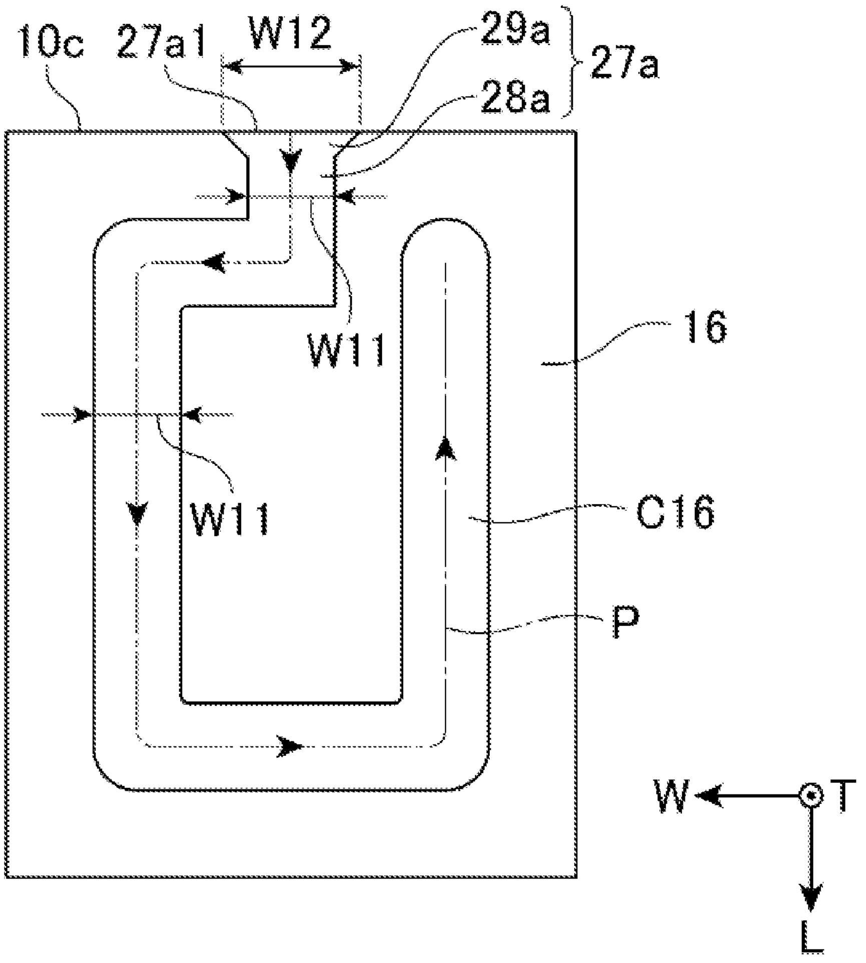
FIG. 6A is a plan view of a magnetic layer 16 in which a conductor pattern C16 and the lead-out portion 27*a* are formed.
Figure 6B:
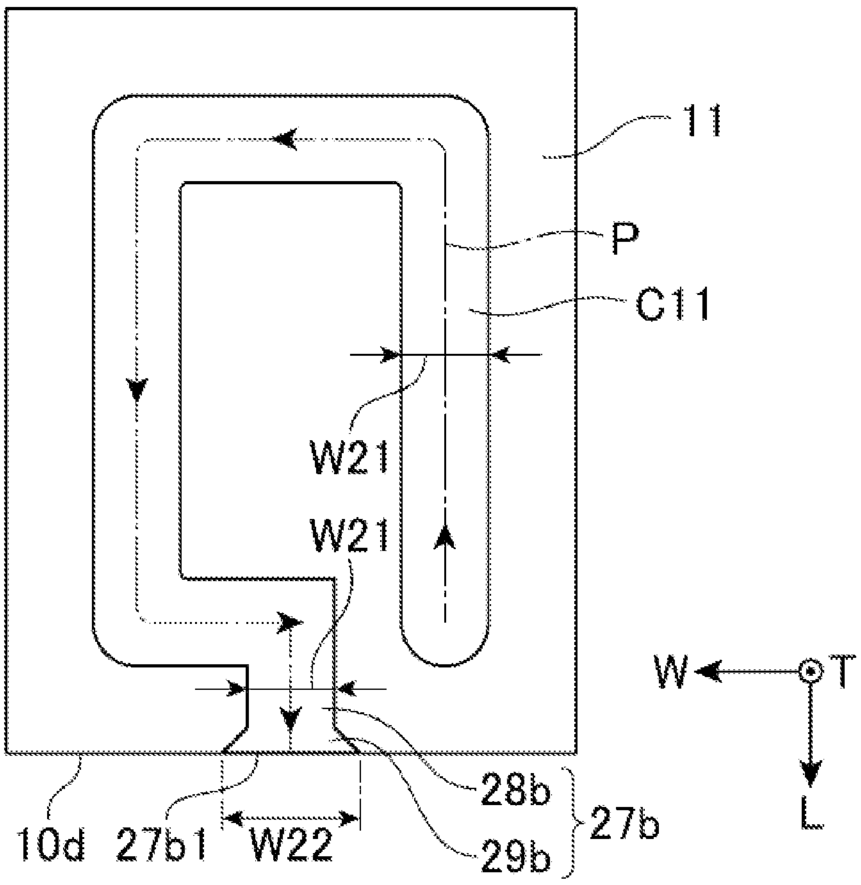
FIG. 6B is a plan view of a magnetic layer 11 in which a conductor pattern C11 and the lead-out portion 27*b* are formed.
Figure 7A:
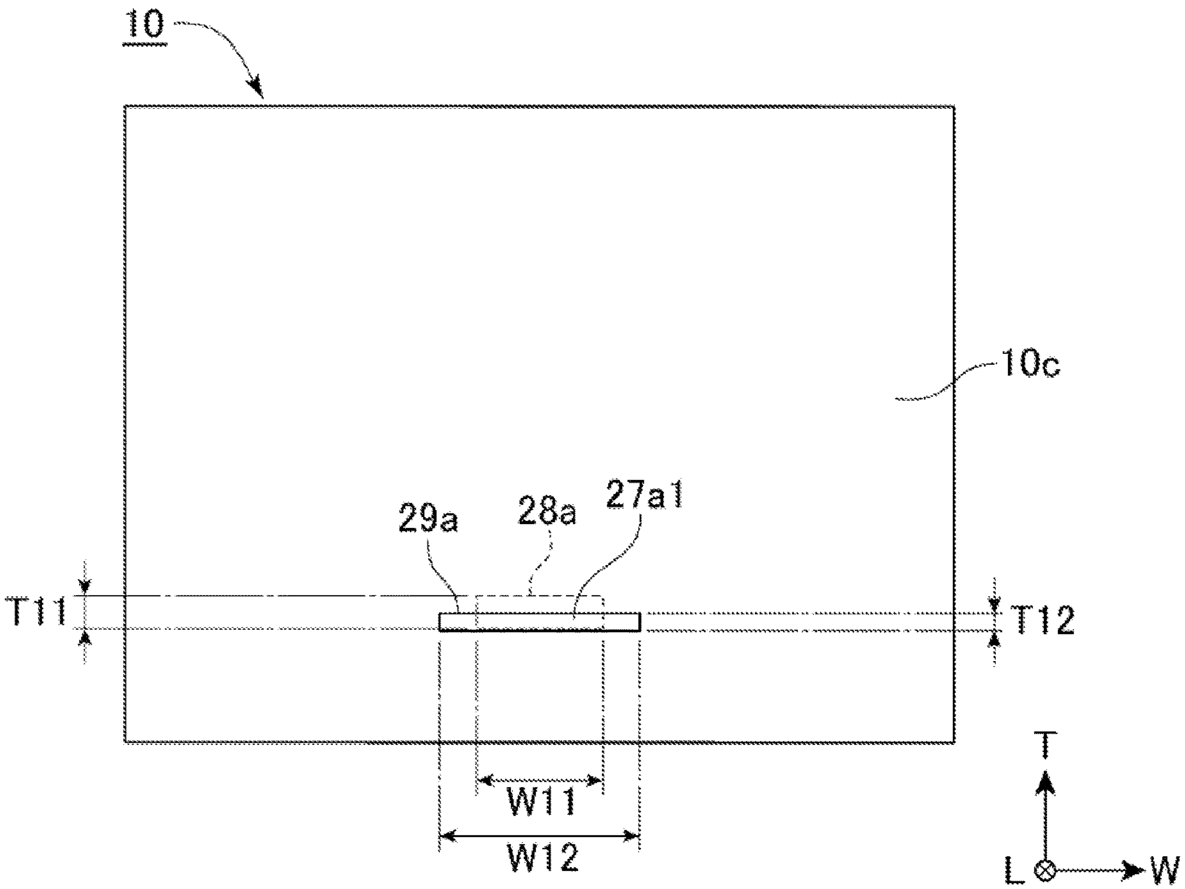
FIG. 7A is a right side view of the coil component of FIG. 1 where external electrodes 21 and 22 are not shown.
Figure 7B:
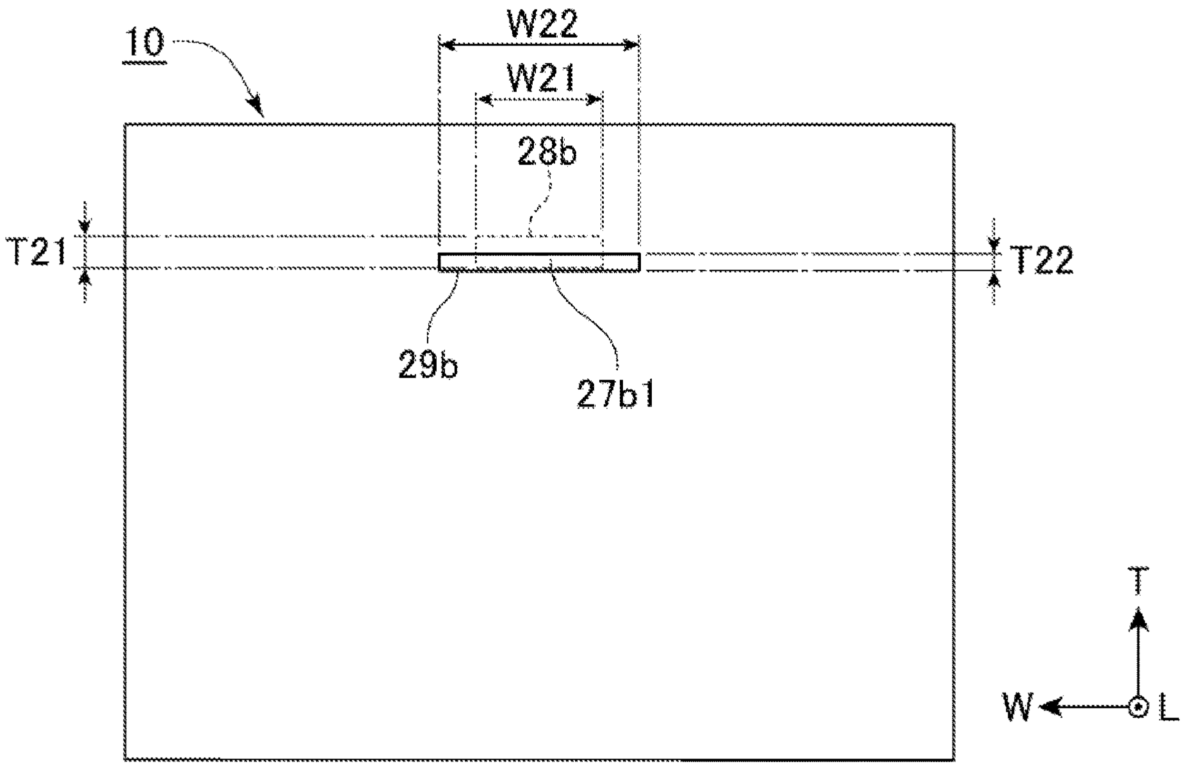
FIG. 7B is a left side view of the coil component of FIG. 1 where the external electrodes 21 and 22 are not shown.

Next, with reference to FIGS. 5A to 7B, a further description is given of the coil component 25. In the illustrated example, it is assumed that current flows through the coil conductor 25 from the external electrode 21 to the external electrode 22 when the coil component 1 is in use. A path P of the current flowing through the coil conductor 25 is illustrated in FIG. 6A and FIG. 6B. FIG. 7A is the right side view of the coil component 1, and FIG. 7B is the left side view of the coil component 1. In both drawings, the external electrodes 21 and 22 are omitted. For convenience of description, a base portion 28*a* is visible through the base body 10 in FIG. 7A, and a base portion 28*b* is visible through the base body 10 in FIG. 7B.

As shown in FIGS. 5A, 6A, and 7A, the lead-out portion 27*a* of the coil conductor 25 has a base portion 28*a* connected to the conductor pattern C16 at one end, and a tip portion 29*a* connected to the other end of the base portion 28*a*. In other words, the base portion 28*a* is disposed between the conductor pattern C16 and the tip portion 29*a*. In the illustrated embodiment, both the base portion 28*a* and the tip portion 29*a* extend along the L-axis direction. The tip portion 29*a* has the end surface 27*a*1, which is exposed from the first end surface 10*c* of the base body 10 to the outside of the base body 10. The tip portion 29*a* is connected to the external electrode 21 at the end surface 27_a_1. The lead-out portion 27_a_ does not necessarily have the base portion 28_a_. When the lead-out portion 27_a_ does not have the base portion 28_a_, the tip portion 29_a_ is connected to the conductor pattern C16.

As shown in FIG. 5A, the lead-out portion 27_a_ is configured such that a dimension T12 of the end surface 27_a_1 in the T-axis direction at the end of the tip portion 29_a_ is smaller than a dimension of a coil portion of the coil conductor 25 in the T-axis direction. The coil portion of the coil conductor 25 herein refers to the portion of the coil conductor 25 that connects one end surface 27_a_1 to the other end surface 27_b_1. The coil portion of the coil conductor 25 may be formed in any shape. When comparing the dimension of the coil portion of the coil conductor 25 with the dimension of the end surface 27_a_1 or the end surface 27_b_1, the dimensions of the section of the coil portion cut in a plane orthogonal to a current path P are compared with the dimensions of the end surface 27_a_1 or the end surface 27_b_1. When referring to the dimensions of the winding portions 26 in the context of comparing the dimensions of the end surface 27_a_1 or the end surface 27_b_1, the dimensions of the winding portion 26 herein refer to the dimensions of any of the conductor patterns C11 to C16 in the winding portion 26, and not to the dimensions of the vias V1 to V5. The dimension in the T-axis direction of a section of each portion of the coil conductor 25 cut in a plane orthogonal to the current path P may be herein referred to as a "thickness dimension" of the portion. The thickness dimension of the winding portion 26 means a thickness dimension of any of the conductor patterns C11 to C16 forming the winding portion 26. When comparing the thickness dimension of the winding portion 26 with a dimension T12 of the end surface 27_a_1 in the T-axis direction, the thickness dimension T11 of the conductor pattern C16 connected to the lead-out portion 27_a_ of the winding portion 26 is used as the thickness dimension of the winding portion 26. Thus, when the thickness dimension T12 of the end surface 27_a_1 is smaller than the thickness dimension of the winding portion 26, it means that the thickness dimension T12 of the end surface 27_a_1 is smaller than the thickness dimension T11 of the conductor pattern C16. The thickness dimension of the conductor pattern C16 may be equal to the thickness dimension of the base portion 28_a_. In this case, the thickness dimension (i.e., dimension in the T-axis direction) of the base portion 28_a_ is also T11. In one or more embodiments of the invention, the thickness dimension T11 of the conductor pattern C16 is in the range of 30 to 110 μm (both inclusive). In one or more embodiments of the invention, the dimension T12 of the end surface 27_a_1 in the T-axis direction is in the range of 15 to 105 μm (both inclusive).

As shown in FIG. 6A, a dimension W12 of the end surface 27_a_1 in the W-axis direction is larger than a dimension W11 of a section of the conductor pattern C16 cut in the plane orthogonal to the current path P. The dimension W11 is measured along the direction orthogonal to the T-axis. The dimension of the section of each portion of the coil conductor 25 measured along a direction orthogonal to the T-axis direction may be herein referred to as a "width dimension" of the portion, and the section is cut in the plane orthogonal to the current path P. Accordingly, the width dimension of the conductor pattern C16 is W11. In one or more embodiments of the invention, the width dimension W11 of the conductor pattern C16 is 15 to 250 μm (both inclusive). The width dimension W11 of the conductor pattern C16 may be smaller or larger than this. The width dimension W11 of the conductor pattern C16 may be larger than the thickness dimension T11.

In the illustrated embodiment, the width dimension of the base portion 28_a_ is equal to the width dimension W11 of the conductor pattern C16. The tip portion 29_a_ has a larger width at a position closer to the first end surface 10_c_ (e.g., end surface 27_a_1) than the width at the position where it is connected to the base portion 28_a_ when viewed in the plane (from the T-axis direction). Thus, the width dimension (dimension in the W-axis direction) W12 of the end surface 27_a_1 situated at the end of the tip portion 29_a_ is larger than the width dimension W11 of the base portion 28_a_. The width dimension W12 of the end surface 27_a_1 may be larger than the thickness dimension T12 of the end surface 27_a_1. The width dimension W12 of the end surface 27_a_1 may be three or more times, or five or more times, the thickness dimension T12 thereof.

In one or more embodiments of the invention, the area of the end surface 27_a_1 and/or the area of the section of the tip portion 29_a_ cut in a plane orthogonal to the current path P is equal to the area of the section of the base portion 28_a_ cut in a plane orthogonal to the current path P. In one or more embodiments of the invention, the area of the end surface 27_a_1 and/or the area of the section of the tip portion 29_a_ cut in a plane orthogonal to the current path P is equal to the area of the section of the winding portion 26 cut in a plane orthogonal to the current path P. As described above, although the tip portion 29_a_ has the dimension T12 in the T-axis direction that is smaller than the dimension of the conductor pattern C16 in the T-axis direction, the area of the tip portion 29_a_ orthogonal to the current path P is equal to the area of the other portion of the coil conductor 25 orthogonal to the current path P. Therefore the DC resistance of the coil conductor 25 can be the same at any point on the current path P.

In one or more embodiments of the invention, the area of the end surface 27_a_1 and/or the area of the section of the tip portion 29_a_ cut in a plane orthogonal to the current path P is larger than the area of the section of the base portion 28_a_ cut in a plane orthogonal to the current path P. In one or more embodiments of the invention, the area of the end surface 27_a_1 and/or the area of the section of the tip portion 29_a_ cut in a plane orthogonal to the current path P is larger than the area of the section of the winding portion 26 cut in a plane orthogonal to the current path P. As described above, although the tip portion 29_a_ has the dimension T12 in the T-axis direction that is smaller than the dimension of the conductor pattern C16 in the T-axis direction, the area of the tip portion 29_a_ orthogonal to the current path P is larger than the area of the other portion of the coil conductor 25 orthogonal to the current path P. Therefore it is possible to firmly connect the coil conductor 25 to the external electrode 21 without increasing the DC resistance of the coil conductor 25.

As shown in FIG. 7A, the tip portion 29_a_ is configured such that the dimension T12 of the end surface 27_a_1 in the T-axis direction is smaller than the dimension W12 in the W-axis direction. Thus, in the illustrated embodiment, the T-axis direction is a short-axis direction of the end surface 27_a_1, and the W-axis direction orthogonal to the T-axis is a long-axis direction of the end surface 27_a_1. In other words, the dimension of the end surface 27_a_1 in the short-axis direction is T12, and the dimension in the long-axis direction is W12. Similarly, the base portion 28_a_ and the conductor pattern C16 are configured such that their thickness dimension T12 is smaller than the width dimension W12. Therefore, in the illustrated embodiment, the section of the base portion 28*a* cut in a plane orthogonal to the current path P has the short-axis direction in the T-axis direction and the long-axis direction in the direction orthogonal to the T-axis. Similarly, the section of the conductor pattern C16 cut in a plane orthogonal to the current path P has the short-axis direction in the T-axis direction and the long-axis direction in the direction orthogonal to the T-axis. In other words, the dimension in the short-axis direction of the section of the conductor pattern C16 orthogonal to the current path P is T11, and the dimension in the long-axis direction is W11.

In one or more embodiments of the invention, the ratio of the dimension of the end surface 27*a*1 of the lead-out portion 27*a* in the short axis direction to the dimension in the short axis direction of the section of the coil portion of the coil conductor 25 orthogonal to the current path P is 0.5 to 0.95 (both inclusive). In the illustrated embodiment, the ratio of the dimension T12 of the end surface 27*a*1 of the lead-out portion 27*a* in the short-axis direction to the dimension T11 of the end surface 27*a*1 of the lead-out portion 27*a* in the short-axis direction (i.e., the thickness dimension T11 of the conductor pattern C16) (T12/T11) is 0.5 to 0.95 (both inclusive). For convenience of explanation, the ratio of the dimension of the end surface 27*a*1 of the lead-out portion 27*a* in the short-axis direction to the dimension in the short-axis direction of the section of the coil portion of the coil conductor 25 orthogonal to the current path P (e.g., T12/T11) is hereinafter referred to as "short-axis-direction dimension ratio". The upper limit of the short-axis-direction dimension ratio (T12/T11) may be 0.9, 0.85, 0.8, 0.75, 0.7, 0.65, or 0.6. When the short-axis-direction dimension ratio is small, current load is excessively concentrated at the position where the thickness dimension shifts from T11 to T12 in the middle of the current path P of the coil conductor 25, which may cause an open failure. When the short-axis-direction dimension ratio is too small, the reliability of the coil component will decrease as described above. Therefore, in one or more embodiments of the invention, the lower limit of the short-axis-direction dimension ratio is 0.5.

As shown in FIGS. 5B, 6B, and 7B, the lead-out portion 27*b* of the coil conductor 25 has the base portion 28*b*, one end of which is connected to the conductor pattern C11, and a tip portion 29*b*, which is connected to the end of the base portion 28*b* opposite to the end connected to the other end. In the illustrated embodiment, the lead-out portion 27*b* is formed axisymmetrically to the lead-out portion 27*a* with respect to the axis extending along the T-axis when viewed in the section shown in FIG. 3. Therefore, the description of the lead-out portion 27*a* will be used to describe the lead-out portion 27*b* unless there is a contradiction. In order to avoid repetition, the lead-out portion 27*b* will now be briefly described.

As shown in FIG. 5B, the lead-out portion 27*b* is configured such that a thickness dimension T22 of the end surface 27*b*1 in the T-axis direction at the end of the tip portion 29*b* is smaller than a dimension T21 of the winding portion 26 (conductor patter C11) in the T-axis direction. As shown in FIG. 6B, a dimension W22 of the end surface 27*b*1 in the W-axis direction is larger than a dimension W21 (width dimension W21) of a section of the conductor pattern C11 cut in the plane orthogonal to the current path P. The dimension W21 is measured along the direction orthogonal to the T-axis. The area of the end surface 27*b*1 and/or the area of the tip portion 29*b* orthogonal to the current path P may be equal to the area of a section of the base portion 28*b* cut in a plane orthogonal to the current path P and/or the area of a section of the winding portion 26 cut in a plane perpendicular to the current path P. In this case, the DC resistance of the coil conductor 25 can be the same at any point on the current path P. As shown in FIG. 7B, the tip portion 29*b* is configured such that the thickness dimension T22 of the end surface 27*b*1 is smaller than the width dimension W22. The area of the end surface 27*b*1 and/or the area of the section of the tip portion 29*b* cut in a plane orthogonal to the current path P may be larger than the area of the section of the base portion 28*b* cut in a plane orthogonal to the current path P and/or the area of the section of the winding portion 26 cut in a plane orthogonal to the current path P. In this way, the coil conductor 25 and the external electrode 22 can be firmly connected to each other without increasing the DC resistance of the coil conductor 25.

In one or more embodiments of the invention, the ratio T22/T21, which is the ratio of the dimension T22 of the end surface 27*b*1 of the lead-out portion 27*b* in the short axis direction to the dimension T21 in the short axis direction of the section of the conductor pattern C11 orthogonal to the current path P (that is, the short-axis dimension ratio for the lead-out portion 27*b*) is 0.5 to 0.95 (both inclusive). The upper limit of T22/T21 may be 0.9, 0.85, 0.8, 0.75, 0.7, 0.65, or 0.6.

Figure 8A:
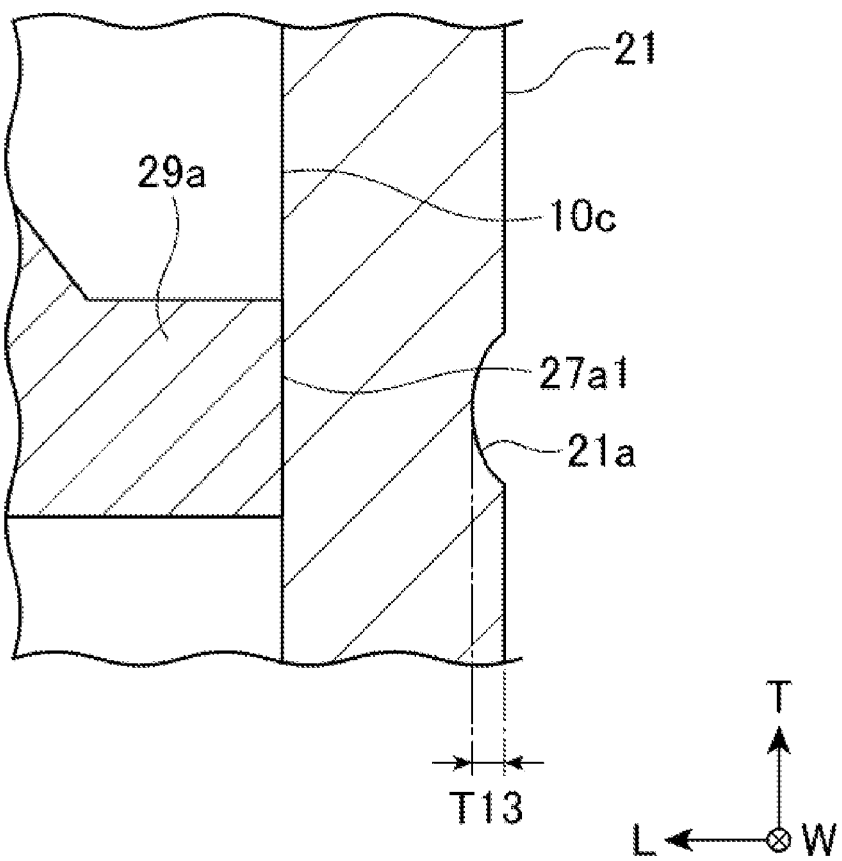
FIG. 8A is an enlarged sectional view of a part of the external electrode 21 in the section of the coil component 1 of FIG. 3.
Figure 8B:
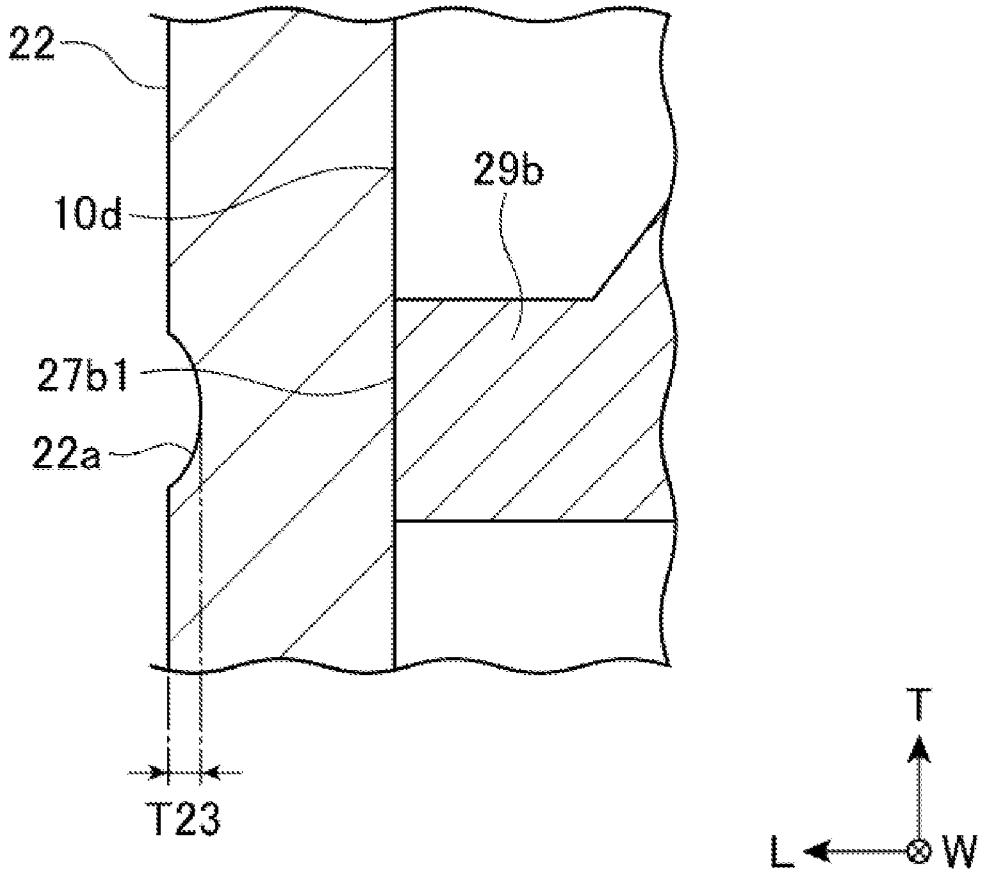
FIG. 8B is an enlarged sectional view of a part of the external electrode 22 in the section of the coil component 1 of FIG. 3.

With reference to FIGS. 8A and 8B, a further description is given of the external electrodes 21 and 22. As shown in FIG. 8A, in one or more embodiments of the invention, a concave portion 21*a* is formed in an outer surface of the external electrode 21 at a position opposite the end surface 27*a*1. The concave portion 21*a* may not be formed in the outer surface of the external electrode 21. Even when the concave portion 21*a* is formed in the external electrode 21, the depth of the concave portion 21*a* is very small relative to the dimensions of the other parts of the coil component 1. For example, the ratio of a depth T13 of the concave portion 21*a* to the thickness dimension T11 of the conductor pattern C16 (T13/T11) is 0.1 or less. The ratio T13/T11, which is the ratio of the depth T13 of the concave portion 21*a* to the thickness dimension T11 of the conductor pattern C16, is herein referred to as a "concave portion depth ratio" of the external electrode 21. Thus, in one or more embodiments of the invention, the concave portion depth ratio of the external electrode 21 is 0.1 or less. The external electrodes 21 and 22 are fabricated, for example, by applying a conductive paste, which is a mixture of metal particles of Ag or the like and thermosetting resin, to a surface of the base body 10, drying the applied conductive paste, and then heat-treating it. This conductive paste may contain glass. The conductive paste may also contain a resin that serves as a binder. The metal particles contained in the conductive paste may be sintered during the heat treatment. The conductive paste, which turns into the external electrodes 21 and 22, is applied to the surface of the base body 10 such that it covers the end surfaces 27*a*1 and 27*b*1. The external electrodes 21, 22 may include a plating layer. There may be two or more plating layers. The two plating layers may include an Ni plating layer and an Sn plating layer externally provided on the Ni plating layer. The external electrodes 21 and 22 may each have a multilayered structure.

As shown in FIG. 8B, in one or more embodiments of the invention, a concave portion 22*a* is formed in an outer surface of the external electrode 22 at a position opposite the end surface 27*b*1. The concave portion 22*a* may not be formed in the outer surface of the external electrode 22. Even when the concave portion 22*a* is formed in the external electrode 22, the depth of the concave portion 22*a* is very small relative to the dimensions of the other parts of the coil component 1. For example, the ratio of a depth T23 of the concave portion 22*a* to the thickness dimension T21 of the conductor pattern C11 (T23/T21) is 0.1 or less. The ratio T23/T21, which is the ratio of the depth T23 of the concave portion 22*a* to the thickness dimension T21 of the conductor pattern C11, is herein referred to as the "concave portion depth ratio" of the external electrode 22. Thus, in one or more embodiments of the invention, the concave portion depth ratio of the external electrode 22 is 0.1 or less.

In the above embodiments, the embodiment in which the coil conductor 25 has the winding portion 26 has been described. However, any configuration of the coil portion connecting one end surface 27*a*1 and the other end surface 27*b*1 of the coil conductor 25 can be adopted. For example, the coil portion of the coil conductor 25 does not have to be wound more than one turn around a particular axis. The coil portion of the coil conductor 25 may include a curved section that is curved, a straight section that extends linearly, or a combination thereof in plan view (viewed from the T-axis direction) or front view (viewed from the W-axis direction). The curved portion may not be wound more than one turn around a particular axis. The coil portion of the coil conductor 25 may, for example, have a straight-line shape extending from the end surface 27*a*1 to the end surface 27*b*1 in plan view.

Next, a description is given of an example of a manufacturing method of the coil component 1. In one or more embodiments of the invention, the coil component 1 is produced by the sheet lamination method in which magnetic sheets are stacked together. The first step of manufacturing the coil component 1 using the sheet manufacturing method, a top laminate, an intermediate laminate, and a bottom laminate are formed. The top laminate will constitute the top cover layer 18, the intermediate lamination will constitute the body portion 20, and the bottom laminate will constitute the bottom cover layer 19. The top laminate is formed by stacking a plurality of magnetic sheets, which are to form the magnetic layers 18*a* to 18*d,* the bottom laminate is formed by stacking a plurality of magnetic sheets, which are to form the magnetic layers 19*a* to 19*d,* and the intermediate laminate is formed by stacking a plurality of magnetic sheets, which are to form the magnetic layers 11 to 16.

In the manufacturing process of the coil component 1, to produce a magnetic body sheet, metal magnetic particles are first kneaded with resin to produce a slurry (this slurry is called "metal magnetic body paste"). This metal magnetic body paste is provided in a molding die and a predetermined molding pressure is applied thereto to obtain the magnetic body sheet. The resin mixed and kneaded together with the metal magnetic particles may be, for example, a polyvinyl butyral (PVB) resin, an epoxy resin, or any other known resins. The magnetic sheet is fabricated such that the void ratio of the base body 10 becomes 5% or more and less than 20% after the heat treatment in the subsequent step. For example, by increasing the filling ratio of the metal magnetic particles in the base body 10, the void ratio of the base body 10 can be adjusted. The filling ratio of the metal magnetic particles in the magnetic sheet can be adjusted by mixing two or more types of metal magnetic particles that have different average particle diameters from each other to obtain the metal magnetic particles, by adjusting the molding pressure, or by any other method.

The intermediate laminate is formed by laminating a magnetic sheet on which unfired conductor patterns corresponding to the conductor pattern C11 and lead-out portion 27*b* are formed, magnetic sheets on which unfired conductor patterns corresponding to the conductor patterns C12 to C15 are formed respectively, and a magnetic sheet on which unfired conductor patterns corresponding to the conductor pattern C16 and lead-out portion 27*a* are formed. A through hole penetrating the sheet in the stacking direction may be formed in each of the magnetic sheets forming the intermediate laminate as necessary. Each unfired conductor pattern is formed by applying the conductive paste to the magnetic sheet with the through hole by screen printing or other means. At this time, the conductor paste fills the through holes in the magnetic sheets, so that unfired vias, which later turn into the vias V1 to V5, are formed.

Figure 9A:
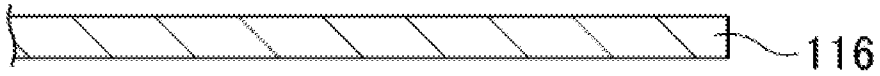
FIGS. 9A to 9C illustrate a part of a manufacturing process (a step of fabricating the lead-out portion) of a coil component according to an embodiment of the disclosure.
Figure 9B:
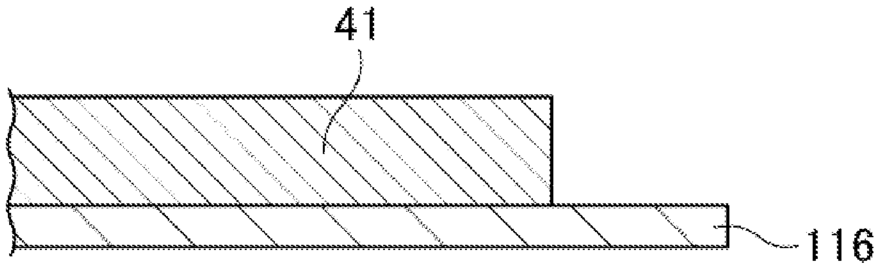
Figure 9C:
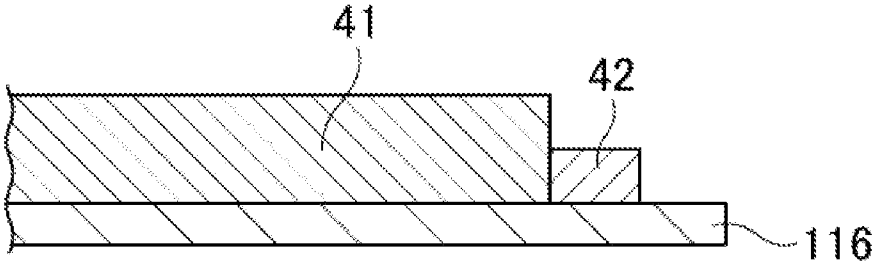

Referring to FIGS. 9A to 9C, a process of forming the unfired conductor pattern including the conductor pattern C16 and the lead-out portion 27*a* on the magnetic sheet according to one or more embodiments of the invention will be now described. As shown in FIG. 9A, a magnetic sheet 116 is first prepared. Next, as shown in FIG. 9B, the conductive paste is applied to an upper surface of the magnetic sheet 116 to form a first conductor layer 41 in a shape corresponding to the conductor pattern C16 in plan view (when viewed from the T-axis direction). The shape of the conductor pattern C16 in plan view is illustrated in FIG. 6A.

Subsequently, as shown in FIG. 9C, a second conductor layer 42 is formed on the upper surface of the magnetic sheet 116 such that it abuts the first conductor layer 41. The second conductor layer has a shape corresponding to the lead-out portion 27*a* in plan view (when viewed from the T-axis direction). After the heat treatment described below, the first conductor layer 41 becomes the conductor pattern C16 and the second conductor layer 42 becomes the lead-out portion 27*a*.

In this way, the unfired conductor pattern including the conductor pattern C16 and the lead-out portion 27*a* is formed on the magnetic sheet 116. Formation of the unfired conductor pattern corresponding to the conductor pattern C11 and the lead-out portion 27*b* on the magnetic sheet is also performed in the same manner as described above. In FIGS. 9A to 9C, for convenience of description, the boundary between the first conductor layer 41 and the second conductor layer 42 is clearly depicted. However, in actual coil components to which the present invention is applied, the boundary between the first conductor layer 41 and the second conductor layer 42 may not be visible.

Either the first conductor layer 41 or the second conductor layer 42 may be first applied to the magnetic sheet 116. When the second conductor layer 42 is applied first, the second conductor layer 42 is applied to the upper surface of the magnetic sheet 116 and then the first conductor layer 41 is applied to the upper surface of the magnetic sheet 116 such that it abuts the second conductor layer 42. When the first conductor layer 41 abuts the second conductor layer 42, a part of the first conductor layer 41 may adhere to a top surface of the second conductor layer 42, or a part of the second conductor layer 42 may adhere to a top surface of the first conductor layer 41.

The shapes of the first conductor layer 41 and the second conductor layer 42 are not limited to the shapes described above. For example, the first conductor layer 41 may have a shape corresponding to the conductor pattern C16 and the base portion 28*a* of the lead-out portion 27*a* in plan view, and the second conductor layer 42 may have a shape corresponding to the tip portion 29*a* of the lead-out portion 27*a* in plan view. In this case, after the heat treatment, the first conductor layer 41 becomes the conductor pattern C16 and the base portion 28*a* of the drawer portion 27*a,* and the second conductor layer 42 becomes the tip portion 29*a*.

Figure 10A:
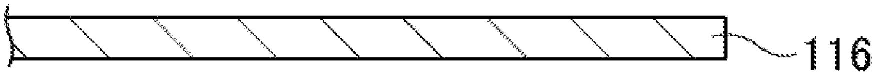
FIGS. 10A to 10C illustrate a modification example of the manufacturing process shown in FIGS. 9A to 9C.
Figure 10B:
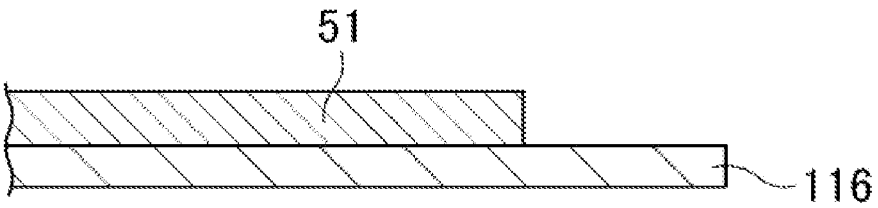
Figure 10C:
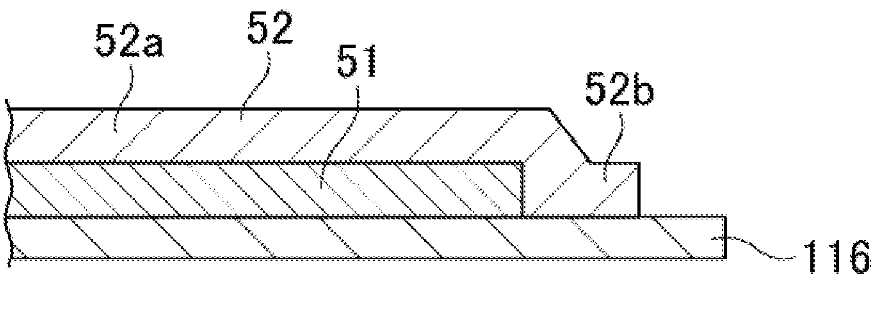

Referring to FIGS. 10A to 10C, a process of forming the unfired conductor pattern including the conductor pattern C16 and the lead-out portion 27*a* on the magnetic sheet according to another embodiment different from the embodiment of FIGS. 9A to 9C will be now described. As shown in FIG. 10A, the magnetic sheet 116 is first prepared. Next, as shown in FIG. 10B, the conductive paste is applied to the upper surface of the magnetic sheet 116 to form a first conductor layer 51 in a shape corresponding to the conductor pattern C16 and the base portion 28*a* of the lead-out portion 27*a* in plan view (when viewed from the T-axis direction). The shape of the conductor pattern C16 in plan view is illustrated in FIG. 6A.

Next, as shown in FIG. 10C, the conductive paste is applied to a top surface of the first conductor layer 51 to form a second conductor layer 52 in a shape corresponding to the conductor pattern C16 and the lead-out portion 27*a* in plan view (when viewed from the T-axis direction). When forming the second conductor layer 52, some of the conductive paste is applied such that the conductive paste spreads out from the first conductor layer 51 and adheres to the upper surface of the magnetic sheet 116. Thus, the second conductor layer 52 has a first region 52*a* that overlaps the first conductor layer 51 in plan view, and a second region 52*b* that does not overlap the first conductor layer 51 in plan view. After the heat treatment described below, the first conductor layer 51 and the first region 52*a* of the second conductor layer 52 become the conductor pattern C16 and the base portion 28*a,* and the second region 52*b* becomes the tip portion 29*a.*

In this way, the unfired conductor pattern including the conductor pattern C16 and the lead-out portion 27*a* is formed on the magnetic sheet 116. Formation of the unfired conductor pattern corresponding to the conductor pattern C11 and the lead-out portion 27*b* on the magnetic sheet is also performed in the same manner as described above. In FIGS. 9A to 9C, for convenience of description, the boundary between the first conductor layer 51 and the second conductor layer 52 is clearly depicted. However, in actual coil components to which the present invention is applied, the boundary between the first conductor layer 51 and the second conductor layer 52 may not be visible.

The shapes of the first conductor layer 51 and the second conductor layer 52 are not limited to the shapes described above. For example, the first conductor layer 51 may be formed in a shape corresponding to the conductor pattern C16 in plan view. In this case, after the heat treatment, the first conductor layer 51 and the first region 52*a* of the second conductor layer 52 become the conductor pattern C16, and the second region 52*b* becomes the base portion 28*a* and the tip portion 29*a.*

Figure 11A:
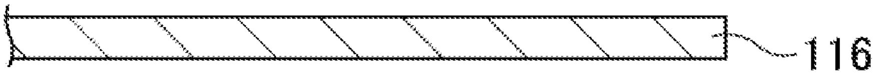
FIGS. 11A to 11C illustrate a modification example of the manufacturing process shown in FIGS. 9A to 9C.
Figure 11B:
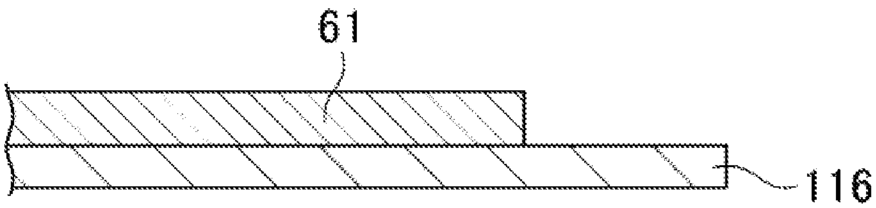
Figure 11C:
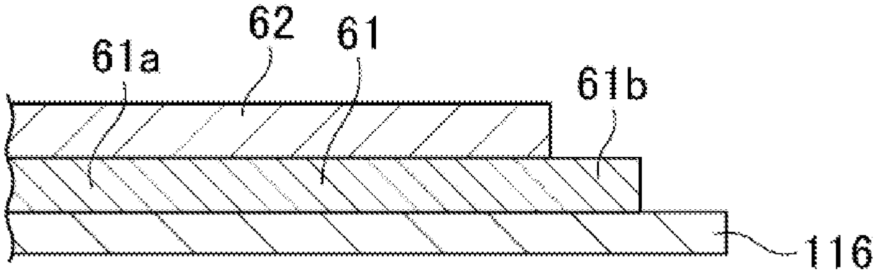

Referring to FIGS. 11A to 11C, a process of forming the unfired conductor pattern including the conductor pattern C16 and the lead-out portion 27*a* according to yet another embodiment different from the embodiment of FIGS. 10A to 10C will be now described. As shown in FIG. 11A, the magnetic sheet 116 is first prepared. Next, as shown in FIG. 11B, the conductive paste is applied to the upper surface of the magnetic sheet 116 to form a first conductor layer 61 in a shape corresponding to the conductor pattern C16 and the lead-out portion 27*a* in plan view (when viewed from the T-axis direction). The shapes of the conductor pattern C16 and the lead-out portion 27*a* in plan view are illustrated in FIG. 6A. Next, as shown in FIG. 11C, the conductive paste is applied to a top surface of the first conductor layer 61 to form a second conductor layer 62 in a shape corresponding to the conductor pattern C16 and the base portion 28*a* in plan view (when viewed from the T-axis direction). When forming the second conductor layer 62, the conductive paste is applied onto a part of the top surface of the first conductor layer 61. Thus, the first conductor layer 61 has a first region 61*a* that overlaps the second conductor layer 62 in plan view, and a second region 61*b* that does not overlap the second conductor layer 62 in plan view. After the heat treatment described below, the first region 61*a* of the first conductor layer 61 and the second conductor layer 62 become the conductor pattern C16 and the base portion 28*a* of the lead-out portion 27*a,* and the second region 61*b* becomes the tip portion 29*a* of the lead-out portion 27*a.* In FIGS. 11A to 11C, for convenience of description, the boundary between the first conductor layer 61 and the second conductor layer 62 is clearly depicted. However, in actual coil components to which the present invention is applied, the boundary between the first conductor layer 61 and the second conductor layer 62 may not be visible.

The shapes of the first conductor layer 61 and the second conductor layer 62 are not limited to the shapes described above. For example, the second conductor layer 62 may be formed in a shape corresponding to the conductor pattern C16 in plan view. In this case, after the heat treatment, the first region 62*a* of the first conductor layer 61 and the second conductor layer 62 become the conductor pattern C16, and the second region 61*b* of the first conductor layer 61 becomes the lead-out portion 27*a* (the base portion 28*a* and tip portion 29*a*).

Thus, the conductor pattern C16 forming the winding portion 26 may formed of two or more conductor layers (the first conductor layer 51 and second conductor layer 52, or the first conductor layer 61 and second conductor layer 62 in the above example), and the lead-out portion 27*a* is formed of a single conductor layer (the second conductor layer 52 or the first conductor layer 61 in the above example). Of the lead-out portion 27*a,* only the tip portion 29*a* may be formed of a single conductor layer, and the base portion 28*a* may be formed of multiple conductor layers.

Next, the intermediate laminate formed in the above-described manner is sandwiched between the top laminate on the top side and the bottom laminate on the bottom side, and the top laminate and the bottom laminate are bonded to the intermediate laminate by thermal compression to obtain a body laminate. Next, the body laminate is diced into pieces of a desired size using a cutter such as a dicing machine or a laser processing machine to obtain chip laminates.

The chip laminated body is degreased and then subjected to heat treatment, so that an intermediate body is obtained. The heating is performed on the chip laminate at a temperature of 400° C. to 900° C. for a duration of 20 to 120 minutes, for example. The degreasing and heating may be concurrently performed. Through the heat treatment, the magnetic sheets turn into the magnetic layers 11 to 16, and the magnetic layers 18*a* to 18*d,* and the magnetic layers 19*a* to 19*d,* respectively. The unfired conductor patterns turn into the conductor patterns C11 to C16, the lead-out portion 27*a,* and the lead-out portion 27*b.* In other words, the intermediate body includes: the base body 10 that includes the magnetic layers 11 to 16, the magnetic layers 18*a* to 18*d,* and the magnetic layers 19*a* to 19*d;* and the coil conductor 25 that includes the conductor patterns C11 to C16, the lead-out portion 27*a,* and the lead-out portion 27*b.*

The external electrodes 21 and 22 are subsequently fabricated, for example, by applying the conductive paste, which is a mixture of metal particles of Ag or the like and thermosetting resin, to the surface of the intermediate body fabricated as described above, drying the applied conductive paste, and then heat-treating it. The conductive paste, which turns into the external electrodes 21 and 22, is applied to the surface of the base body 10 such that it covers the end surfaces 27*a*1 and 27*b*1. The external electrodes 21 and 22 can be fabricated in a variety of ways, in addition to the above-described method. The external electrodes 21 and 22 may be fabricated, for example, by applying a metal paste, which is a mixture of metal particles of Ag or the like, glass, and a resin serving as the binder, to a surface of the base body 10, drying the applied metal paste, and then heat-treating it to sinter the metal particles. The external electrodes 21 and 22 may each have a multilayered structure. The external electrodes 21, 22 may further include a plating layer. There may be two or more plating layers. The two plating layers may include an Ni plating layer and an Sn plating layer externally provided on the Ni plating layer. The coil component 1 is obtained in the above-described manner.

Figure 12A:
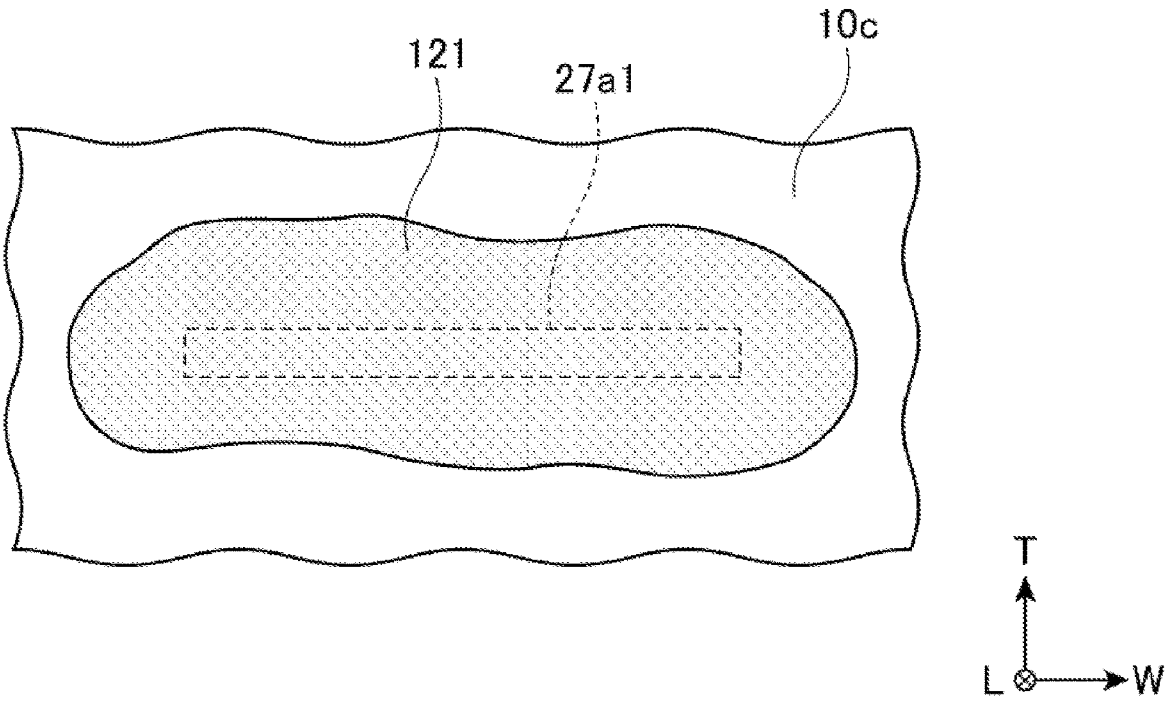
FIG. 12A illustrates of a part of the manufacturing process (a step of applying a conductive paste) of the coil component of FIG. 1.
Figure 12B:
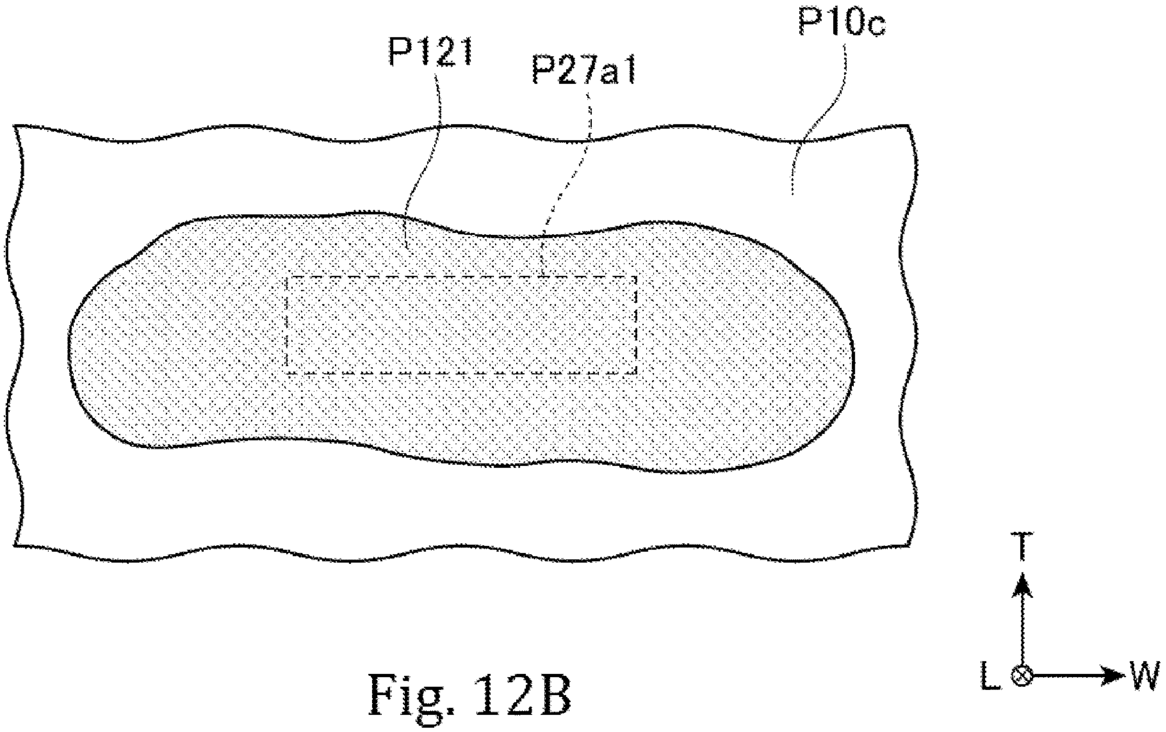
FIG. 12B illustrates of a part of the manufacturing process (a step of applying a conductive paste) of a conventional coil component.

Referring now to FIGS. 12A and 12B, flow of the conductive paste applied to the intermediate body will be described. FIG. 12A illustrates the flow of a conductive paste 121 applied to the surface (first end surface 10*c*) of the intermediate body in one or more embodiments of the invention, and FIG. 12B illustrates flow of a conductive paste P121 applied to a surface of a base body to fabricate an external electrode in a manufacturing process of a conventional coil component. As shown in FIG. 12A, in the embodiment of the present invention, the conductive paste 121 is applied to the first end surface 10*c* of the base body 10 such that the conductive paste covers the end surface 27*a*1 of the lead-out portion 27*a* that is exposed from this first end surface 10*c*. Similarly, in the example of the prior art shown in FIG. 12B, an end surface P27*a*1 of the lead-out portion is exposed from a first end surface P10*c* of the base body, and the conductive paste P121 is applied to the first end surface P10*c* of the base body such that the conductive paste covers the end surface P27*a*1 of the lead-out portion exposed from the first end surface P10*c*.

The shape of the end surface of the lead-out portion differs between the embodiment of the invention shown in FIG. 12A and the conventional example shown in FIG. 12B. In the conventional coil components, the thickness dimension (dimension in the short-axis direction) of the end surface of the lead-out portion was the same as or greater than the thickness dimension (dimension in the short-axis direction) of the winding portion for the purpose of increasing the bonding strength between the coil conductor and the external electrode or for other purposes. Specifically, in the conventional coil components, the ratio of the dimension of the end surface P27*a*1 of the lead-out portion in the short-axis direction to the dimension in the short-axis direction of a section of a conductor pattern orthogonal to the current path was set to 1 or greater. Whereas in one or more embodiments of the invention, the ratio of the dimension T12 of the end surface 27*a*1 of the lead-out portion 27*a* in the short axis direction to the dimension T11 in the short-axis direction of the section of the coil conductor C16 orthogonal to the current path P (T12/T11) is 0.5 to 0.95 (both inclusive). Therefore, as can be understood from the above descriptions with reference to FIGS. 12A and 12B, when the dimension of the winding portion is the same between the coil component of the invention and the conventional coil component, the short-axial dimension of the end surface 27*a*1 of the embodiment is smaller than the short-axial dimension of the conventional end surface P27*a*1.

Since the base body made of metal magnetic material is configured to have a larger void ratio than a base body made of ferrite material, conductive paste applied to the base body made of the metal magnetic material tends to seep into the the base body. Once the conductive paste penetrates the base body, other conductive paste flows in from regions adjacent to the region where the conductive paste has penetrated in the base body. Since the wettability of the conductive paste to the end surface of the lead-out portion is much higher than the wettability to the surface of the base body, a frictional force acting on the conductive paste by the end surface of the lead-out portion is smaller than a frictional force acting on the surface of the base body. Therefore, once the conductive paste penetrates a portion of the base body near the end surface of the lead-out portion, the conductive paste disposed on the end surface of the lead-out portion easily flows into the portion where the conductive paste has penetrated the base body. Since the end surface of the lead-out portion abuts the surface of the base body mainly at the edge extending in the long-axis direction, the conductive paste disposed on the end surface of the lead-out portion tends to flow in the short-axis direction of the end surface.

Thus, when the conductive paste has penetrated in the base body, some conductive paste that is applied to the end surface of the lead-out portion flows mainly in the short-axis direction from the end surface of the lead-out portion to a region of the surface of the base body surrounding the end surface. In the conventional coil component where the dimension in the short-axis direction of the end surface P27*a*1 exposed from the surface P10*c* of the base body is larger than that of the invention, when the conductive paste P121 flows in the short-axis direction of the end surface P27*a*1, the frictional force that prevents the conductive paste from moving in the short-axis direction is small, so that the conductive paste easily flows from the end surface P27*a*1 of the lead-out portion to the surface P10*c* of the base body once the conductive paste has penetrates in the base body in the region around the end surface of the lead-out portion. A relatively large part of the conductive paste flows in the short-axis direction during the manufacturing process of the conventional coil component, so that a concave portion extending in the long-axis direction of the end surface P27*a*1 is likely to be formed in the external electrode at the position opposite the end surface P27*a*1. When heat-treating the conductive paste, thermal stress tends to concentrate on the region near of the concave portion of the conductive paste and residual stress tends to remain in the vicinity of the concave portion of the external electrode in the finished coil component. As described above, when such a concave portion is formed in the external electrode due to the flow of the conductive paste into the base body, the strength of the external electrode is impaired, causing cracks therein. In addition, when the heat treatment is performed onto the conductive paste, stress concentrates on the region around the concave portion in the external electrode, which causes non-uniform stress to act on the base body from the conductive paste that shrinks during the heat treatment. When the base body is a laminate of multiple magnetic layers, the stress acting on the base body from the external electrode during the heat treatment of the conductive paste will easily cause delamination between the layers of the base body. In other words, delamination is more likely to occur in the base body.

Whereas the coil conductor 25 according to one or more embodiments of the invention differs from the conventional coil conductor in that the dimension of the end surface 27*a*1 of the lead-out portion 27*a* in the short-axis direction is smaller than the dimension of the section of the winding portion 26 in the short axis direction. More specifically, the ratio of the dimension T12 of the end surface 27*a*1 of the lead-out portion 27*a* in the short axis direction to the dimension T11 in the short axis direction of the section of the conductor pattern C16 orthogonal to the current path P (T12/T11) is 0.95 or less. Thus, the dimension of the end surface 27*a*1 of the lead-out portion 27*a* in the short-axis direction is smaller than the dimension of the section of the winding portion 26 in the short-axis direction. Unlike the conventional coil component in which the dimension of the end surface of the lead-out portion in the short-axis direction is the same as or larger than the dimension of the winding portion in the short-axis direction, not only the frictional force from the end surface 27*a*1 of the lead-out portion 27*a* but also the frictional force from the surface of the base body 10 (first end surface 10*c*) acts on the conductive paste when the conductive paste 121 flows in the short-axis direction of the end surface 27*a*1. For example, when the conductive paste flows in the positive direction of the T-axis, a frictional force (frictional force in the negative direction of the T-axis) that prevents the conductive paste from flowing in the positive direction of the T-axis acts on the conductive paste from a region of the first end surface 10*c* that is situated on the negative side of the T-axis with respect to the end surface 27*a*1. Conversely, when the conductive paste flows in the negative direction of the T-axis, a frictional force (frictional force in the positive direction of the T-axis) that prevents the conductive paste from flowing in the negative direction of the T-axis acts on the conductive paste from a region of the first end surface 10*c* that is situated on the positive side of the T-axis with respect to the end surface 27*a*1. In this way, in the embodiment of the invention, the frictional force exerts not only from the end surface 27*a*1 but also from the first end surface 10*c* of the base body 10 to the conductive paste flowing from the end surface 27*a*1 to the adjacent region of the first end surface 10*c* of the base body, so that even when penetration of the conductive paste occurs in the region adjacent to the end surface 27*a*1, the flow of conductive paste from the end surface 27*a*1 to an adjacent region of the first end surface 10*c* of the base body is suppressed. Consequently, in the embodiment of the present invention, it is possible to prevent formation of the concave portion in the region of the surface of the external electrode 21 that opposes the end surface 27*a*1 of the lead-out portion 27*a*. In this way, no or less concave portion is formed in the surface of the external electrode 21 in the area facing the end surface 27*a*1 of the lead-out portion 27*a*. Even if the concave portion 21*a* is formed, its depth is reduced, so that the concentration of stress on the external electrode 21 can be prevented. As a result, it is possible to reduce the chances of the occurrence of cracks in the external electrodes 21, 22 and the delamination in the base body 10.

EXAMPLES

Next, examples will now be described. The samples to be evaluated were fabricated in the following manner. First, a plurality of magnetic sheets were made from a metal magnetic paste obtained by kneading metal magnetic particles and polyvinyl butyral (PVB) resin using a sheet forming machine. Through holes were then formed at predetermined positions on the magnetic sheets. A conductive paste, which is a mixture of metal particles of Ag or the like and a binder resin (epoxy resin), was applied, by the screen printing method, to the magnetic sheets in which the through holes had been formed to obtain the magnetic sheet on which unfired conductor patterns corresponding to the conductor pattern C11 and lead-out portion 27*b* are formed, magnetic sheets on which unfired conductor patterns corresponding to the conductor patterns C12 to C15 are formed respectively, and the magnetic sheet on which unfired conductor patterns corresponding to the conductor pattern C16 and the lead-out portion 27*a*. Thirteen types of magnetic sheets with different thicknesses of the unfired conductor patterns were prepared as the magnetic sheets with unfired conductor patterns corresponding to the conductor pattern C16 and the lead-out portion 27*a*. The thirteen types of the magnetic sheets were prepared such that the unfired conductor patterns corresponding to the conductor pattern C16 and the lead-out portion 27*a* were configured to have the following predetermined values of the short-axis dimension ratio (T12/T11) respectively, which is the ratio of the dimension T12 of the end surface 27*a*1 of the lead-out portion 27*a* in the short-axis direction to the dimension T11 in the short-axis direction of the section of the conductor pattern C16 perpendicular to the current path P, after heat treatment.

(1) 0.2
(2) 0.35
(3) 0.45
(4) 0.48
(5) 0.5
(6) 0.54
(7) 0.65
(8) 0.8
(9) 0.9
(10) 0.95
(11) 1.0
(12) 1.1
(13) 1.25

Subsequently, these magnetic sheets with the unfired conductor patterns and magnetic body sheets without unfired conductor patterns were stacked to create a body laminate, and this body laminate was diced into individual chip laminates using a dicing machine. The chip laminated body was degreased and then subjected to heat treatment to obtain an intermediate body. The external electrodes 21 and 22 are subsequently fabricated, for example, by applying the conductive paste, which is a mixture of metal particles of Ag or the like and thermosetting resin, to the surface of the intermediate body fabricated as described above, and then heat-treating it. In this way, the thirteen types of coil components with different short-axis dimensional ratios were fabricated. Twenty coil components were fabricated for each type.

Figure 13:
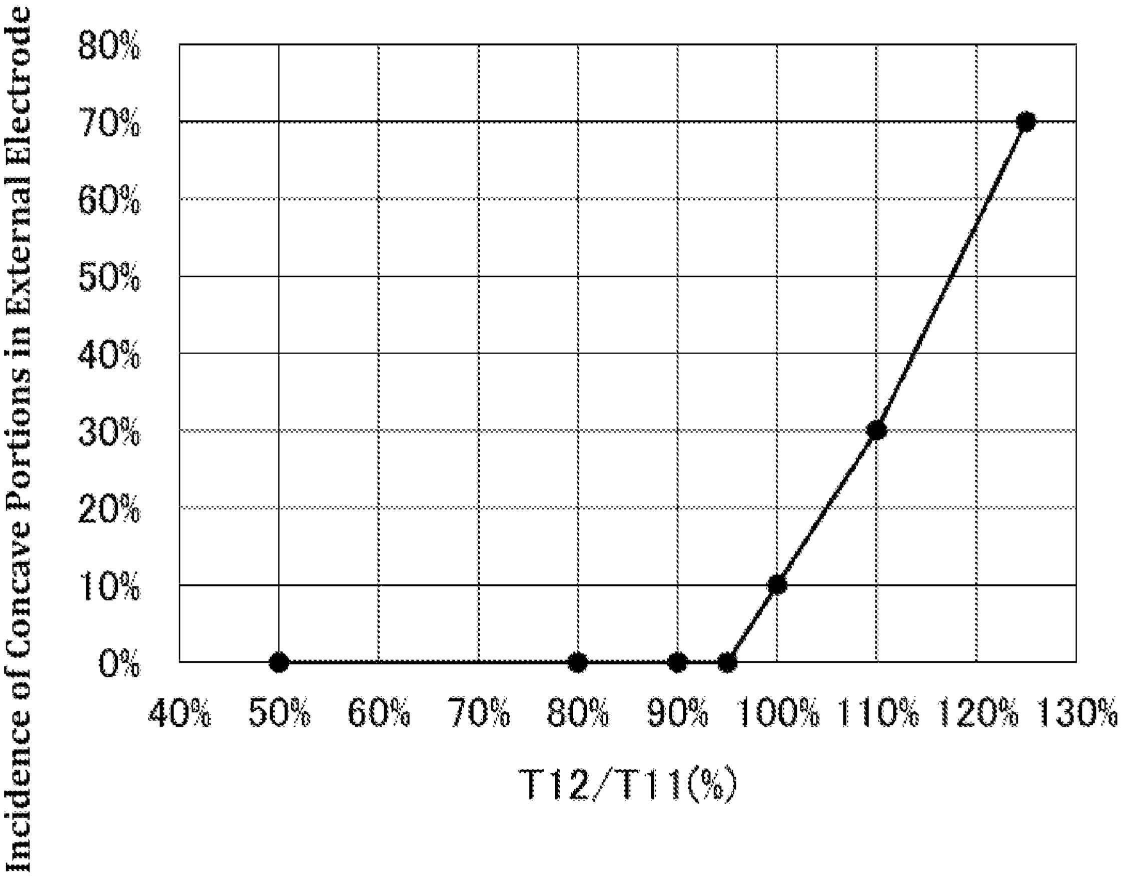
FIG. 13 is a graph showing a relationship between T12/T11 and an incidence of a concave portion in the external electrode 21.

Next, for each of the thirteen types of coil components fabricated as described above, we checked whether the concave portion was formed in the region opposite the end surface of the lead-out portion of the external electrode. Since some unevenness is inevitably formed on the surface of the external electrode, it was determined that the coil component had the concave portion when the concave portion was deeper than 0.1 times the thickness T11 of the conductor pattern C16 of the external electrode at a position opposite the end surface of the lead-out portion. FIG. 13 shows the experiment result. FIG. 13 is a graph showing the relationship between the short-axis direction dimension ratio (T12/T11) and the incidence of the concave portion in the external electrode 21. The short-axis directional dimension ratio is shown on the horizontal axis in percentage, and the proportion of the number of coil components in which the concave portion was confirmed among the twenty coil components is shown on the vertical axis in percentage. As shown in FIG. 13, it was confirmed that no concave portions were formed in the external electrodes of the coil components with a short-axis dimension ratio of 0.95 or less.

Whereas when the short-axis dimension ratio was 1.0, it was confirmed that two of the twenty coil components had the concave portion formed in the external electrode at the position opposite the end surface of the lead-out portion. In other words, for the coil components with a short-axis dimension ratio of 1.0, the incidence of the concave portion was 10%. As shown in FIG. 13, the incidence of the concave portion increased as the short-axis dimension ratio increased, and the incidence of the concave portion in the coil component with a short-axis dimension ratio of 1.1 was 30%, and that in the coil coil component with a short-axis dimension ratio of 1.25 was 70%. Thus, it was found that the formation of the concave portion in the external electrode can be prevented by setting the short-axis dimension ratio (T12/T11) to 0.95 or less.

Figure 14:
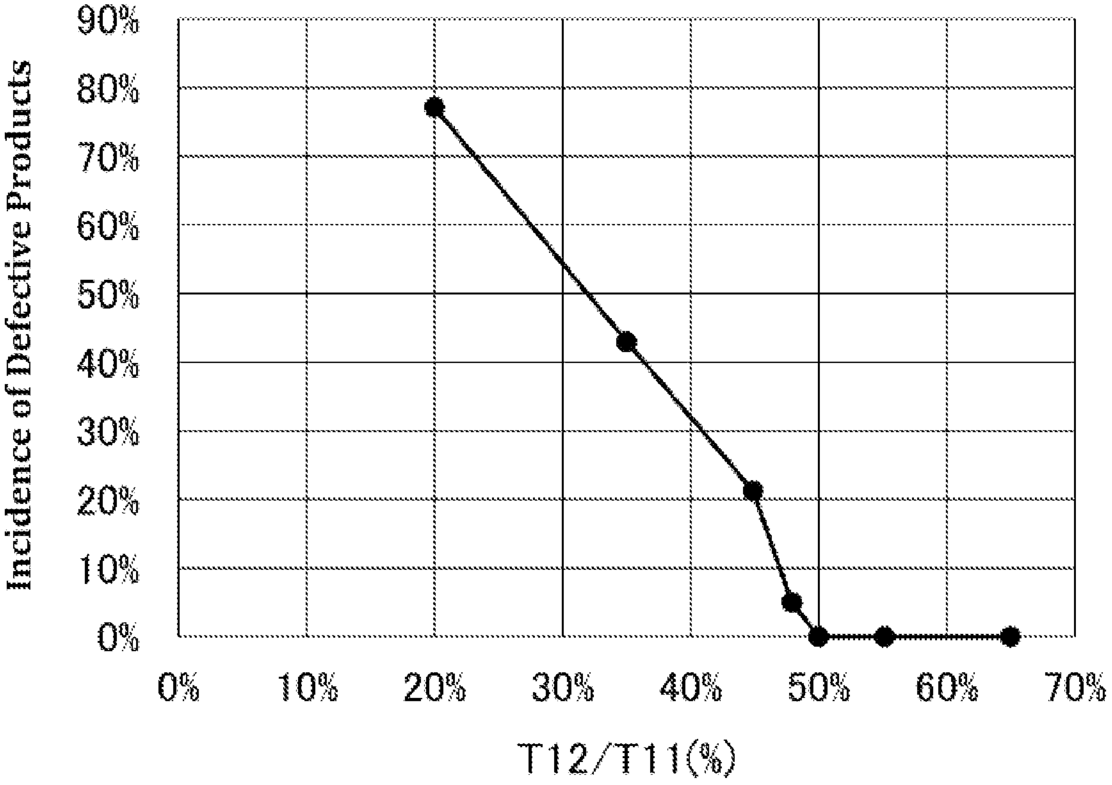
FIG. 14 is a graph showing a relationship between T12/T11 and a rejection rate in a high-temperature reliability test.

For the thirteen types of coil components, the relationship between the dimension ratio in the short axis direction and a high temperature reliability fabricated was also evaluated. Some of the results are shown in FIG. 14. In a high temperature reliability test to evaluate the high temperature reliability, a voltage with an electric field strength of 1 V/μm was applied between the external electrodes in the coil component of each sample at a temperature of 85° C. The point at which the current stopped flowing therethrough was regarded as a failure (open failure). Samples having a time-to-failure of more than 1000 hours were considered as acceptable products and samples having a time-to-failure of 1000 hours or less were considered defective products. As shown in FIG. 14, none of the coil components having a short-axis dimension ratio of 0.5 or more were determined as the defective products. Whereas when the end surface 27A1 was smaller than 0.5, some samples were determined as the defective products, and one of the twenty coil components having a short-axis dimension ratio of 0.48 was determined as defective. As shown in FIG. 14, the incidence of defective products increased as the short-axis dimension ratio became smaller, and the incidence of defective product in the coil components with a short-axis dimension ratio of 0.45 was 20%, the incidence of concave portions in the coil components with a short-axis dimension ratio of 0.35 was 45%, and the incidence of concave portions in the coil components with a short-axis dimension ratio of 0.2 was 75%. From these results, it was found that excellent high temperature reliability could be obtained by setting the short axis dimension ratio (T12/T11) to 0.5 or more. When the short-axis dimension ratio is smaller than 0.5, the thickness of the coil conductor 25 changes steeply from T11 to T12 in the middle of the current path P and the current load is concentrated at the position where the thickness changes, which was considered to impair the reliability.

Figure 15:
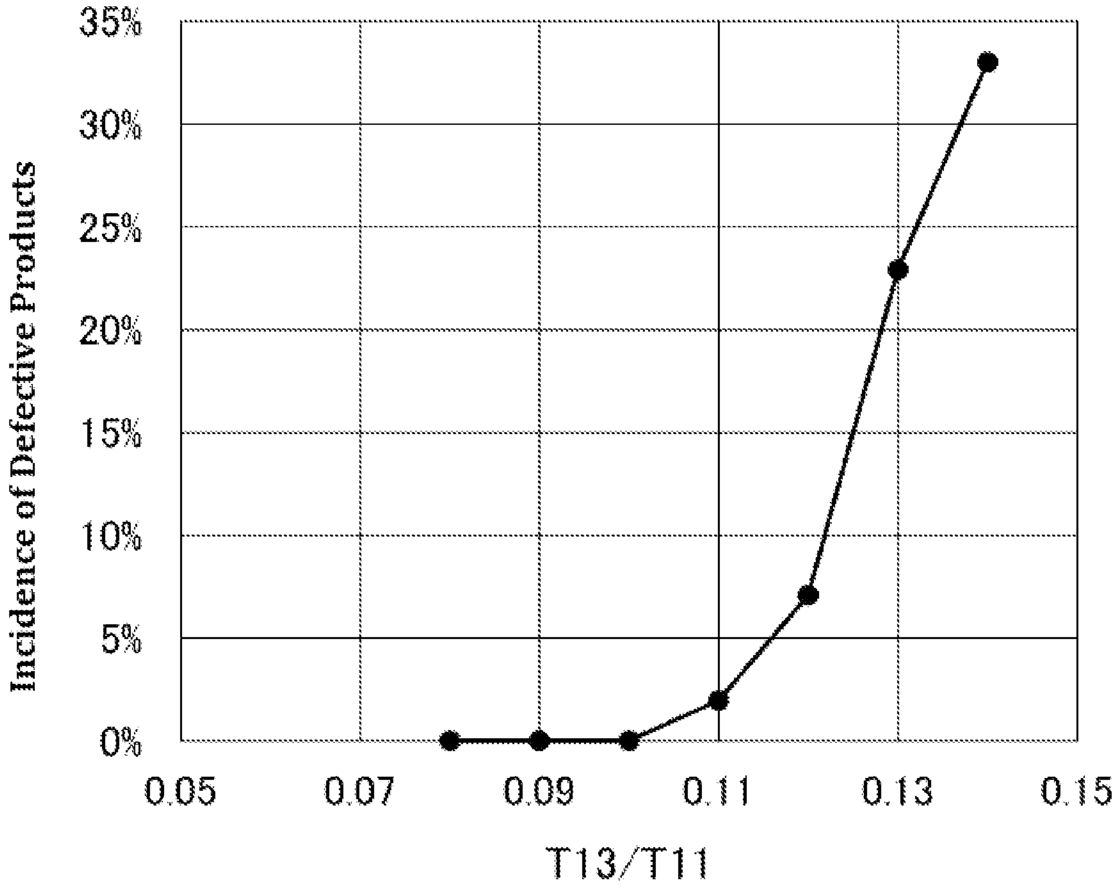
FIG. 15 is a graph showing a relationship between T13/T11 and the rejection rate in the high-temperature reliability test.

Also investigated was the relationship between the results of the high temperature reliability test described above and the concave-portion depth ratio (T13/T11), which is the ratio of the depth T13 of the concave portion formed in the external electrode at the position opposite the end surface of the lead-out portion to the thickness dimension T11 of the conductor pattern C16. The relationship between the concave-portion depth ratio and the incidence of defective products was shown in FIG. 15. As shown in FIG. 15, there were no defective products in the coil components with a concave-portion depth ratio of 0.1 or less. Whereas when the concave-portion depth ratio was greater than 0.1, defective components were generated, and it was confirmed that the incidence of defective components tended to increase as the concave-portion depth ratio increased.

Advantageous effects of the above embodiments will be now described. Whereas in one or more embodiments of the invention, the short-axis dimension ratio (T12/T11), which is the ratio of the dimension T12 of the end surface **27*a*1 of the lead-out portion 27*a* in the short axis direction to the dimension T11 in the short-axis direction of the section of the winding portion 16 (coil conductor C16) orthogonal to the current path P, is 0.5 to 0.95 (both inclusive). Thus, the dimension of the end surface 27*a*1 of the lead-out portion 27*a* in the short-axis direction is smaller than the dimension of the section of the winding portion 26 in the short-axis direction. Unlike the conventional coil component in which the dimension of the end surface of the lead-out portion in the short-axis direction is the same as or larger than the dimension of the winding portion in the short-axis direction, not only the frictional force from the end surface 27*a*1 of the lead-out portion 27*a* but also the frictional force from the surface of the base body 10 (first end surface 10*c*) acts on the conductive paste when the conductive paste 121 flows in the short-axis direction of the end surface 27*a*1. Therefore, even if the conductive paste penetrates into the base body 10 in a region adjacent to the end surface 27*a*1, it is possible to suppress the flow of the conductive paste from the end surface 27*a*1 to the adjacent region of the first end surface 10*c* of the base body. Consequently, it is possible to prevent formation of the concave portion in the region of the surface of the external electrode 21 that opposes the end surface 27*a*1 of the lead-out portion 27*a*. In this way, no or less concave portion is formed in the surface of the external electrode 21 in the region opposite the end surface 27*a*1 of the lead-out portion 27*a*. Even if the concave portion 21*a* is formed, its depth is reduced, so that the concentration of stress on the external electrode 21 can be prevented. As a result, it is possible to reduce the chances of the occurrence of cracks in the external electrode 21 and the delamination in the base body 10**.

The coil conductor 25 in one or more embodiments of the invention is configured to have a short-axis dimension ratio (T12/T11), which is the ratio of the dimension T12 of the end surface **27*a*1 of the lead-out portion 27*a* in the short axis direction to the dimension T11 in the short-axis direction of the section of the winding portion 11 (coil conductor C16) orthogonal to the current path P, of 0.95 or less. In this way, cracking in the external electrode 22** can be prevented.

In one or more embodiments of the invention, the short-axis dimension ratio (T12/T11), which is the ratio of the dimension T12 of the end surface **27*a*1 of the lead-out portion 27*a* in the short axis direction, is 0.5 or more, so that a coil component with a good reliability can be obtained. In one or more embodiments of the invention, a coil component with an excellent reliability is obtained because the short-axis dimension ratio (T22/T21) of the lead-out portion 27*b*** is 0.5 or more.

In one or more embodiments of the invention, even when the concave portion **21*a* is formed in the outer surface of the external electrode 21 at a position opposite the end surface 27*a*1 of the lead-out portion 27*a*, the concave-portion depth ratio (T13/T11), which is the ratio of the depth T13 of the concave portion 21*a* to the dimension T11 of the section of the winding portion 26 (conductor pattern C16) in the short axis direction, is 0.1 or less. By configuring the external electrode 21 such that the concave-portion depth ratio is 0.1 or less, it is possible to suppress the concentration of stress on the region of the external electrode 21 around the end surface 27*a*1 of the lead-out portion 27*a*, thereby suppressing the occurrence of a crack in the external electrode 21. Similarly for the external electrode 22, by configuring the external electrode 22 such that the concave-portion depth ratio for the concave portion 22***a* is 0.1 or less, it is possible to reduce the chance of cracks in the external electrode 22.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

Alternatively, the coil component 1 may be manufactured by a method known to those skilled in the art other than the sheet manufacturing method, for example, a slurry build method, a thin film process method, or a compression molding method.

What is claimed is:

1. A coil component comprising:

a base body containing a plurality of metal magnetic particles;

a coil conductor having a coil portion disposed in the base body and an end surface exposed from a first surface of the base body, a ratio of a dimension of the end surface in a short axis direction to a dimension of a section of the coil portion in a short axis direction being 0.5 or more, and less than 0.6, the section of the coil portion being orthogonal to a direction in which current flows through the coil portion; and an external electrode provided on the first surface of the base body, the external electrode being connected to the end surface of the coil conductor.

2. The coil component of claim 1, wherein a void ratio of the base body is 5% or more and less than 20%.

3. The coil component of claim 1, wherein the coil conductor includes a winding portion wound around a coil axis and a lead-out portion that has the end surface and is connected to one end of the winding portion.

4. The coil component of claim 3, wherein the external electrode has a concave portion in its outer surface at a position opposite the end surface of the lead-out portion, and wherein a ratio of a depth of the concave portion to a dimension in a short-axis direction of a section of the winding portion orthogonal to a direction in which current flows through the winding portion is 0.1 or less.

5. The coil component of claim 3, wherein the dimension in the short-axis direction of the section of the winding portion orthogonal to the direction in which current flows through the winding portion is in a range of 30 to 110 μm.

6. The coil component of claim 3, wherein the winding portion and the lead-out portion are formed of conductive paste having a same composition.

7. The coil component of claim 3, wherein a void ratio of the lead-out portion is less than 1%.

8. The coil component of claim 3, wherein a dimension of the end surface of the lead-out portion in a long-axis direction is larger than a dimension in a long-axis direction of a section of the winding portion orthogonal to a direction in which current flows through the winding portion.

9. The coil component of claim 3, wherein an area of the end surface of the lead-out portion is equal to an area of a section of the winding portion orthogonal to a direction in which current flows through the winding portion.

10. The coil component of claim 3, wherein the lead-out portion is formed of a single conductive layer, and wherein the winding portion is formed of multiple conductive layers.

11. The coil component of claim 10, wherein an area of the end surface of the lead-out portion is equal to a section of the base portion cut in a plane parallel to the first surface.

12. The coil component of claim 10, wherein an area of the end surface of the lead-out portion is larger than a section of the base portion cut in a plane parallel to the first surface.

13. The coil component of claim 3, wherein a ratio of a dimension of the end surface of the lead-out portion in a short-axis direction to a dimension in a short-axis direction of a section of the winding portion cut in a plane parallel to the coil axis is 0.5 to 0.54.

* * * * *